US 12,341,469 B2

(12) United States Patent
Di Stefano et al.

(10) Patent No.: US 12,341,469 B2
(45) Date of Patent: Jun. 24, 2025

(54) METHOD AND SYSTEM FOR ASSEMBLING AND INSTALLING ARRAYS OF PHOTOVOLTAIC SOLAR PANELS IN AN OUTDOOR FIELD

(71) Applicant: Comau S.p.A., Grugliasco (IT)

(72) Inventors: Giovanni Di Stefano, Grugliasco (IT); Francesco Beccarisi, Grugliasco (IT); Maurizio Pollano, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 357 days.

(21) Appl. No.: 17/921,738

(22) PCT Filed: May 7, 2021

(86) PCT No.: PCT/IB2021/053885
§ 371 (c)(1),
(2) Date: Oct. 27, 2022

(87) PCT Pub. No.: WO2021/229387
PCT Pub. Date: Nov. 18, 2021

(65) Prior Publication Data
US 2023/0163720 A1    May 25, 2023

(30) Foreign Application Priority Data
May 11, 2020 (IT) .................. 102020000010507

(51) Int. Cl.
*H02S 30/10* (2014.01)
*B25J 11/00* (2006.01)

(52) U.S. Cl.
CPC ............. *H02S 30/10* (2014.12); *B25J 11/008* (2013.01)

(58) Field of Classification Search
CPC ................................. H02S 30/10; B25J 11/008
See application file for complete search history.

(56) References Cited

U.S. PATENT DOCUMENTS 8,316,590 B2* 11/2012 Cusson ................... H02S 20/10
126/621
8,464,496 B2* 6/2013 Cusson ................... F24S 25/12
126/621
(Continued)

FOREIGN PATENT DOCUMENTS

CL   2020001237 A1   11/2020
CL   2020003187 A1   4/2021
(Continued)

OTHER PUBLICATIONS

U.S. Appl. No. 17/921,738, filed Oct. 27, 2022 entitled: Method and System for Assembling and Installing Arrays of Photovoltaic Solar Panels in an Outdoor Field.
(Continued)

*Primary Examiner* — Saul Rodriguez
*Assistant Examiner* — Ashley K Romano
(74) *Attorney, Agent, or Firm* — Young Basile Hanlon & MacFarlane, P.C.

(57) ABSTRACT

A method for assembling and installing arrays (1) of photovoltaic solar panels (P) in an outdoor field, includes a first step of assembling an array (1) of photovoltaic solar panels, which is carried out with the aid of at least one robot (R) in a transportable station (S1), located adjacent to the installation field (F). In a second step the assembled array (1) of photovoltaic solar panels is transported from the station (S1) to the site of installation of the array (1) of photovoltaic solar panels with the aid of a motorized carriage (V) controlled by an operator external to the carriage. Finally, the method includes a third step of assembling the array (1) of photovoltaic solar panels thus transported, wherein the array (1) of photovoltaic solar panels is mounted on support structures (5) previously prepared in the installation field (F).

26 Claims, 18 Drawing Sheets

(56) References Cited

U.S. PATENT DOCUMENTS

| | | | |
|---|---|---|---|
| 8,567,134 | B1 | 10/2013 | Grushkowitz et al. |
| 9,352,941 | B2 * | 5/2016 | Wheeler ............... B66C 19/005 |
| 11,245,353 | B2 | 2/2022 | Di Stefano et al. |
| 2011/0072631 | A1 | 3/2011 | Hartelius et al. |
| 2012/0027550 | A1 * | 2/2012 | Bellacicco .............. H01L 31/18 |
| | | | 414/547 |
| 2013/0048056 | A1 | 2/2013 | Kilgore et al. |
| 2014/0246257 | A1 * | 9/2014 | Jacobsen ................ F41H 7/005 |
| | | | 180/14.2 |
| 2014/0360552 | A1 | 12/2014 | Britcher et al. |
| 2017/0137238 | A1 * | 5/2017 | Kamata .................. H02S 10/00 |
| 2018/0191289 | A1 | 7/2018 | Zhu |

FOREIGN PATENT DOCUMENTS

| | | |
|---|---|---|
| DE | 10 2010 038054 A1 | 3/2012 |
| EP | 2356382 B1 | 12/2016 |
| WO | 2014/108196 A1 | 7/2014 |
| WO | 2017161358 A2 | 9/2017 |
| WO | 2019097348 A1 | 5/2019 |
| WO | 2019097359 A1 | 5/2019 |
| WO | 2019237030 A1 | 12/2019 |
| WO | 2021229387 A2 | 11/2021 |

OTHER PUBLICATIONS

U.S. Appl. No. 18/037,850, filed May 19, 2023 entitled: Method for Outdoor Installation of an Array of Solar Converters, and Carriage Used in the Method.

* cited by examiner

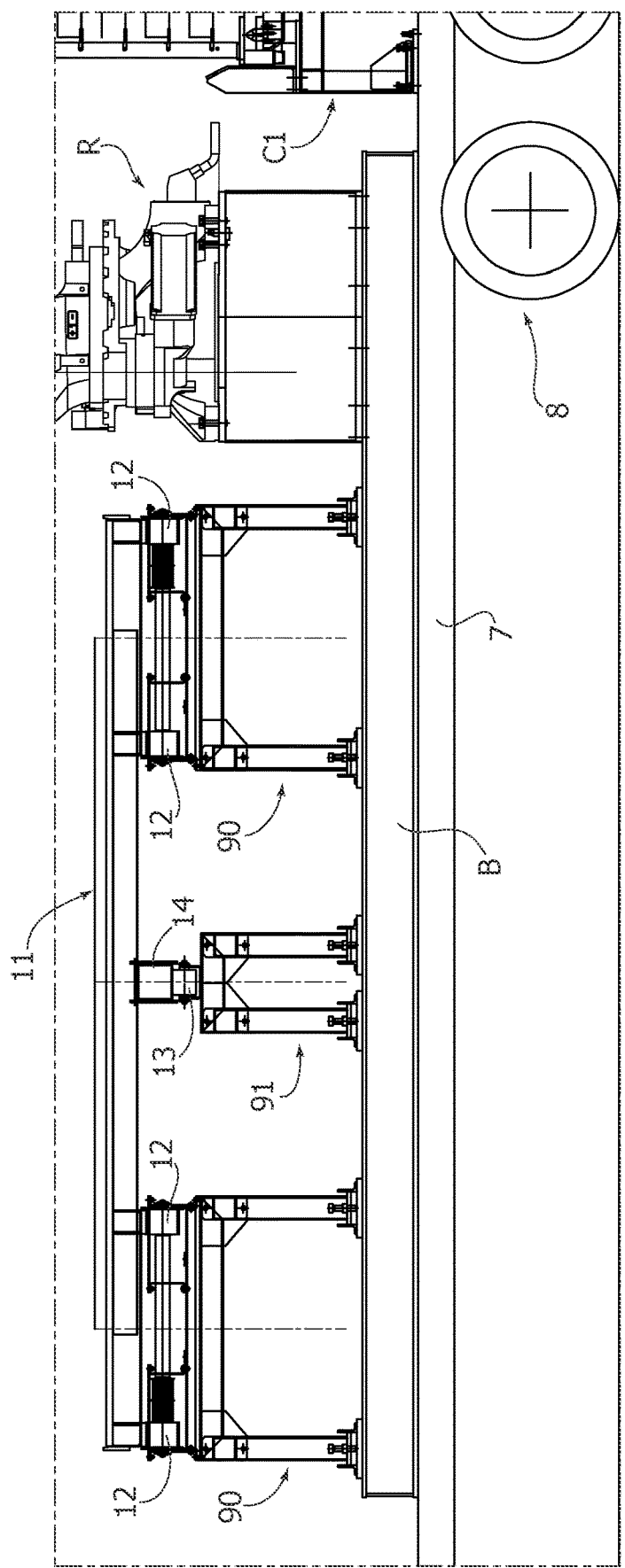

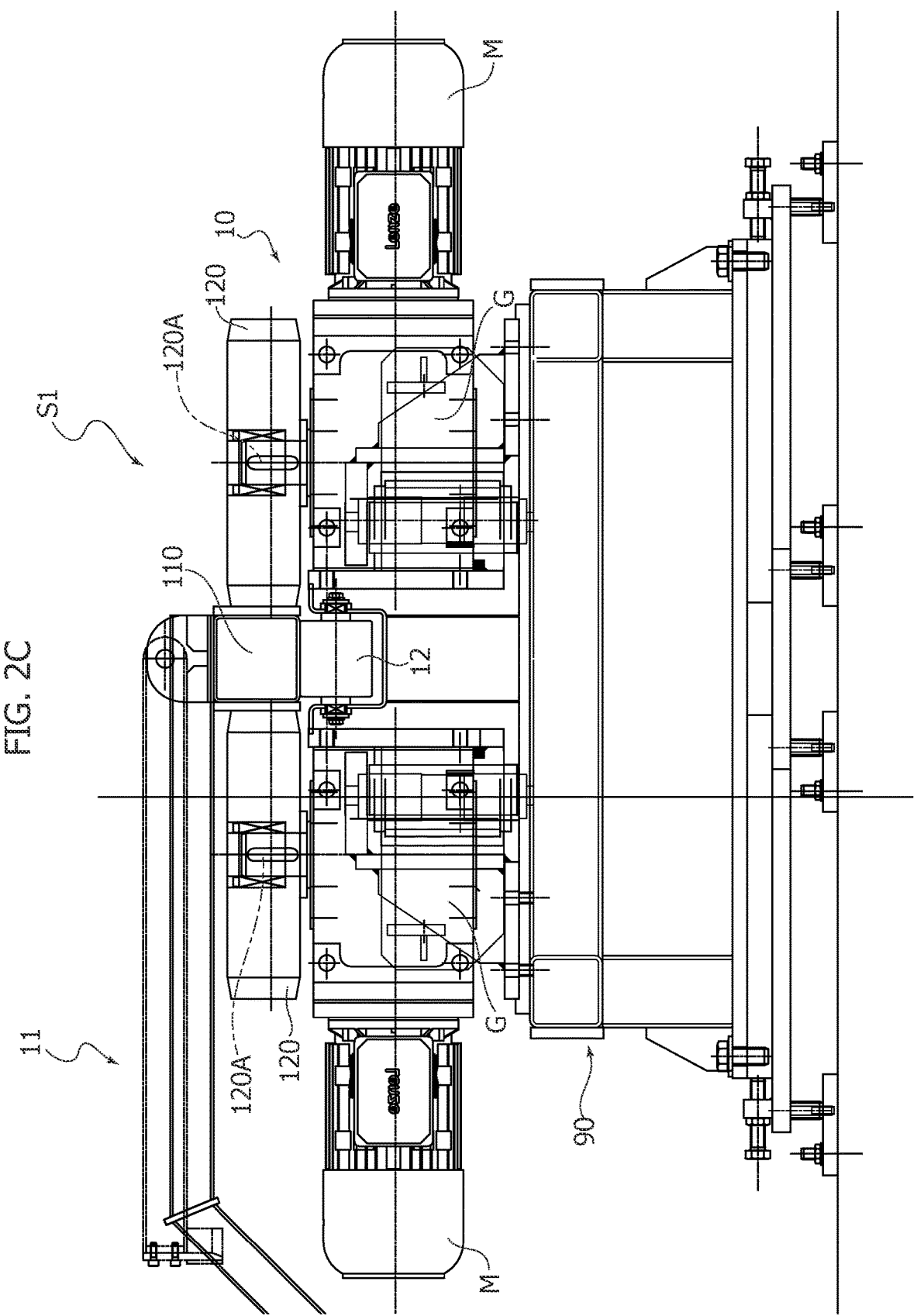

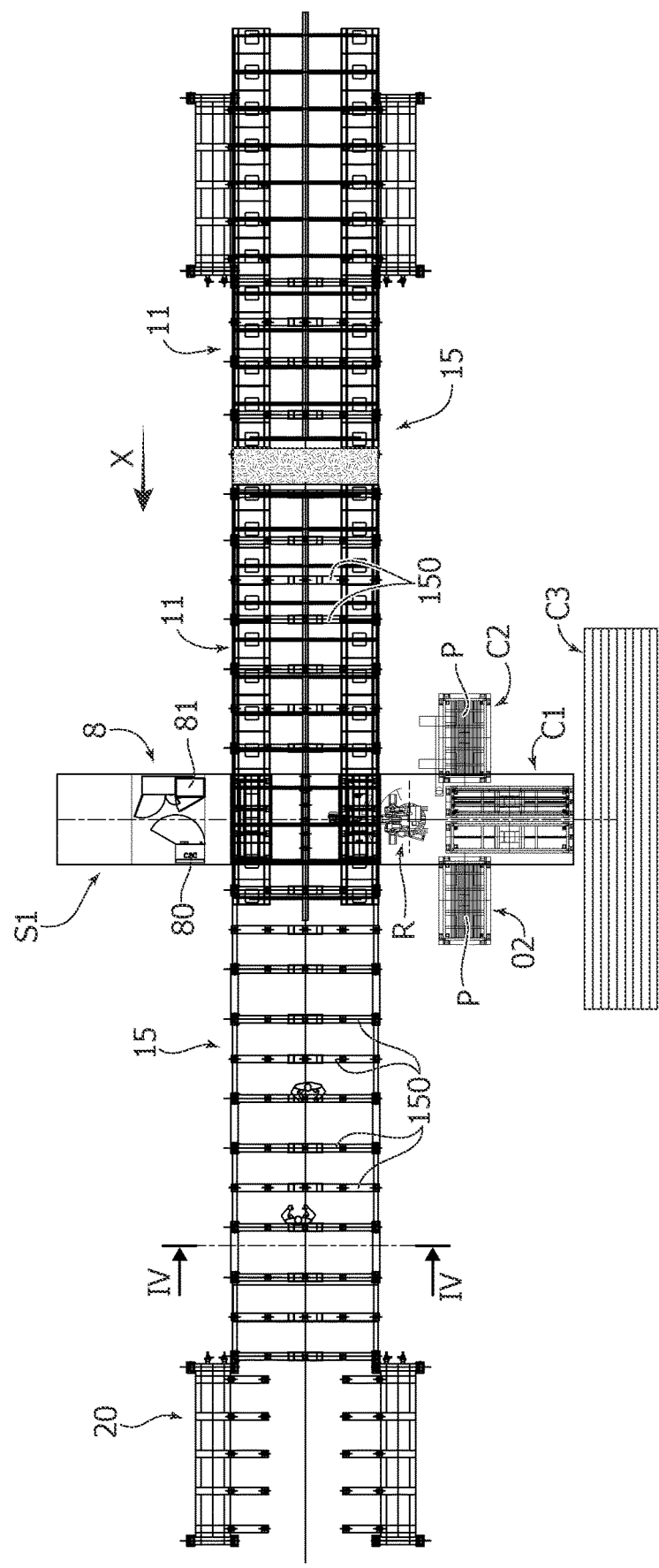

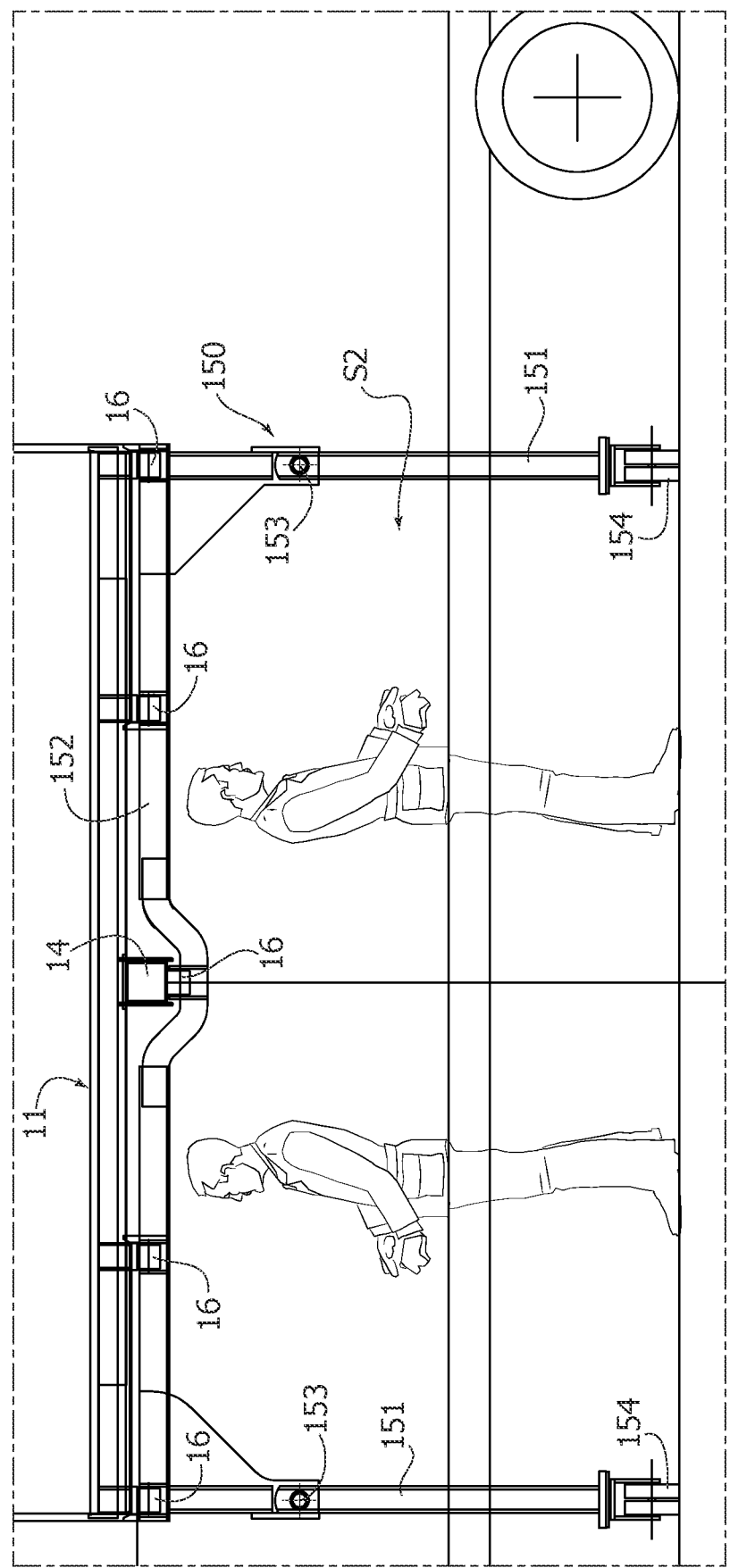

FIG. 20
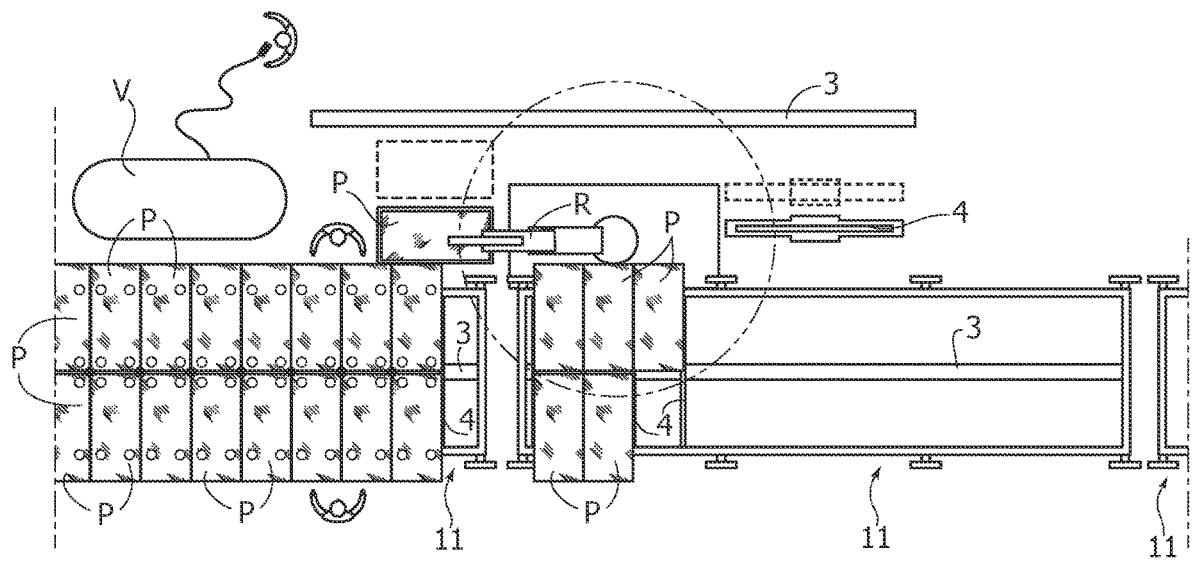
FIG. 21
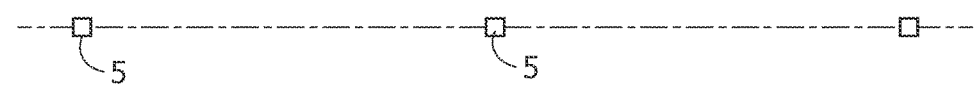
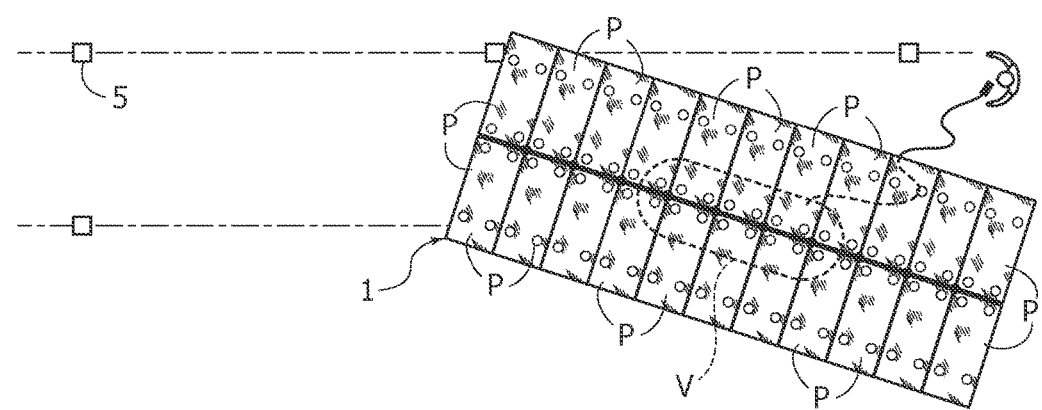

METHOD AND SYSTEM FOR ASSEMBLING AND INSTALLING ARRAYS OF PHOTOVOLTAIC SOLAR PANELS IN AN OUTDOOR FIELD

CROSS-REFERENCE TO RELATED APPLICATIONS

This application is filed pursuant to 35 U.S.C. § 371 claiming priority benefit to PCT/IB 2021/053885 filed May 7, 2021, which claims priority benefit to Italian Patent Application No. 102020000010507 filed May 11, 2020, the contents of both applications are incorporated herein by reference in their entirety for all purposes.

TECHNICAL FIELD

The present invention relates to a method and system for assembling and installing arrays of photovoltaic solar panels in an outdoor field.

BACKGROUND

In document WO 2019/097348 A1 the Applicant has already proposed a method and a system for the installation in an outdoor field of arrays of photovoltaic solar panels, wherein a support frame for the photovoltaic solar panels is preliminarily installed in an outdoor field, after which the photovoltaic solar panels are mounted on the support frame by a robot arranged onboard a vehicle that moves along the installation field, positioning the photovoltaic solar panels on successive portions of this support framework. The main advantage of this solution lies in the possibility of carrying out the installation operation of the photovoltaic solar panels in a completely automatic way. The vehicle carrying the robot can be, for example, a self-driving vehicle or a remotely controlled vehicle. The robot is associated with a vision system which is used by the robot's control system to correctly position the photovoltaic solar panels, despite the variability of the position of the vehicle with respect to the support framework, due to the irregularities of the ground.

Naturally, the aforesaid known solution involves a relative complexity of the system and may not be suitable where the cost of the installation system is to be as low as possible.

SUMMARY

Therefore, a main object of the present invention is to provide a method and a system for assembling and installing arrays of photovoltaic solar panels in an outdoor field, which are relatively simple and of low cost.

A further object of the invention is to achieve the aforesaid objective while ensuring maximum reliability of the system, as well as a high operating flexibility, understood as the possibility of easy adaptation to each different specific application.

Another object of the invention is to provide a method and a system of the type indicated above, which guarantee maximum efficiency, understood as the ability to install a large number of photovoltaic solar panels in an extremely short time, without compromising the accuracy of the installation or the operator safety.

Yet another object of the invention is to provide a method and a system that can be easily and quickly reconfigured according to the characteristics of the installation field.

With a view to achieving one or more of the aforesaid objects, the invention relates to a method for assembling and installing arrays of photovoltaic panels in an outdoor field, comprising:
a) a first step of assembling an array of photovoltaic solar panels, which is carried out, with the help of at least one robot, in a transportable station located adjacent to the installation field, in the manner of a temporary factory,
b) a second step of transporting the array of photovoltaic solar panels assembled in said first step, wherein the assembled array of photovoltaic panels is transported from said station to the installation site of the array of photovoltaic solar panels with the aid of a motorized carriage,
c) a third step of assembling the array of photovoltaic solar panels transported in said second step to the place of installation, where the array of photovoltaic solar panels is mounted on support structures previously prepared on the field.

The aforesaid first assembly step comprises assembling a support framework for the photovoltaic solar panels and assembling a plurality of photovoltaic solar panels on said support framework.

In the preferred embodiment, the aforesaid station for carrying out the first assembly step comprises a base structure, transportable, on which said at least one robot is mounted and located in position and on which a bench is also mounted and located in position, which supports a conveying line section for an auxiliary support structure, on which said array of photovoltaic solar panels is assembled. One or more piece-holder containers are also mounted and located in position on said base structure, arranged with pieces and components that are picked up by said at least one robot, and assembled together to constitute said support framework for the photovoltaic solar panels. One or more containers for the photovoltaic solar panels to be installed are also mounted and located in position on the aforesaid base structure.

Still referring to the preferred embodiment, said at least one robot loosely assembles the components of the support framework together and assembles—in a loose manner—the photovoltaic solar panels on top of said components. The connection of the components and of the photovoltaic solar panels is completed manually by operators placed in a position adjacent to said station.

The aforesaid auxiliary support structure, on which the array of photovoltaic solar panels is assembled, is in the form of a horizontal auxiliary frame, which is made to advance along said section of the conveying line, above said bench carried by the base structure, to bring in succession different portions of said auxiliary frame adjacent to said at least one robot and to allow the robot to assemble the aforesaid support framework and the photovoltaic solar panels on the auxiliary frame.

Again in the case of the preferred embodiment, the aforesaid second transporting step is performed with the aid of a motorized carriage, without a driver, which is controlled by an operator outside the vehicle, and which is configured to take the assembled array of photovoltaic panels on itself and to deposit it above the support structures set up in the field.

The motorized carriage may, for example, be made according to the so-called AGV or AMR technology, with one or more motorized wheels and one or more steering wheels, at least one electric motor to control the traction wheels and at least one electric motor to control the steering of the steering wheels, as well as an electric power supply battery and an electronic control that receives instructions from the operator, for example, by wire or wirelessly. However, the use of a carriage equipped with an internal combustion traction engine is not excluded.

In one example, the base structure that is transportable, arranged in said station, is constituted by a floor of an industrial vehicle.

According to another aspect, the invention also relates to a system for assembling and installing arrays of photovoltaic panels in an outdoor field, comprising:

a transportable station, to be located adjacent to the installation field, comprising at least one robot configured and programmed to assemble an array of photovoltaic solar panels, and—a motorized carriage for transporting the array of photovoltaic solar panels assembled at said station to a place of installation of the array of photovoltaic solar panels in the installation field, where the array of photovoltaic solar panels is to be assembled on support structures previously arranged in the field.

As already indicated, the station comprises a base structure, transportable, on which said at least one robot is mounted and located in position and on which a bench that supports a section of conveying line for an auxiliary support structure is also mounted and located in position, on which said array of photovoltaic solar panels is assembled by assembling a support framework for the photovoltaic solar panels and assembling a plurality of photovoltaic solar panels on said support framework.

As already indicated, the auxiliary support structure on which the array of photovoltaic solar panels is assembled is in the form of a horizontal auxiliary frame, which is made to advance along the section of conveying lines, above said bench carried by the base structure, to bring in succession different portions of said auxiliary frame adjacent to said at least one robot and allow the robot to assemble on the auxiliary framework of aforesaid support framework and of the photovoltaic solar panels.

The aforesaid section of the conveying line comprises a support and guide device carried by said bench, to support and guide a movement of said auxiliary frame in a longitudinal horizontal direction, and an actuating device, carried by said bench, to activate a movement of said auxiliary frame along said longitudinal horizontal direction. In one example, said support and guide device comprises a plurality of rollers or wheels rotatably mounted on the structure of said bench. Moreover, in this example, at least some of said rollers or wheels are motorized, so that they also act as a device for activating the movement of the auxiliary frame.

At least one electronic controller is mounted on the base structure of the station to control said at least one robot and to control said device for activating the movement of the auxiliary frame, said at least one electronic controller being configured to advance said auxiliary frame up to an operating position wherein said at least one robot assembles on it the support framework of the photovoltaic solar panels and positions the photovoltaic solar panels on the support framework thus assembled.

In a preferred embodiment, the electronic controller is configured to advance said auxiliary frame in steps, to allow said at least one robot to carry out assembling the support frame and the photovoltaic panels step by step, on different portions of said auxiliary support frame. The bench carried by said base structure is provided with a locating device, to locate said auxiliary support frame in a predetermined position after each movement step thereof.

Again in the case of the preferred embodiment, the system is arranged with an aligned series of auxiliary support frames, connected to each other in a removable manner, and which can be positioned in succession on said bench carried by said base structure of the station, to allow the assembly on each auxiliary frame of a respective array of photovoltaic solar panels.

Again in the case of the embodiment example, upstream and/or downstream of said bench carried by the base structure of said station, with reference to the direction of movement of the series of auxiliary support frames, an independent support structure is provided, equipped with a support and guide device for the auxiliary frame. The independent support structure is provided with an upper surface with freely rotatable rollers or wheels, to support and guide the movement of auxiliary support frames attached to the support frame, the movement of which is driven by said actuation device carried by said bench.

As already indicated, in an example, the base structure, transportable, arranged in said station is constituted by a platform of an industrial vehicle, said bench being arranged on said platform with said support and guide device for supporting and guiding said auxiliary support frame in a direction of horizontal movement, and perpendicular to the longitudinal direction of the floor of the industrial vehicle.

Again in the case of the preferred embodiment example, the aforesaid auxiliary support frame is configured to retain thereon—in a condition of temporary connection—both the components of the support framework of the array of photovoltaic solar panels which are placed on the auxiliary frame by said at least one robot, and the photovoltaic solar panels which are placed on the support framework by said at least one robot. The system also comprises a station adjacent to said station where the connection of the components and the photovoltaic solar panels is completed manually by operators.

The motorized carriage arranged to transport the array of photovoltaic solar panels assembled in said station up to an installation site is designed to take the assembled array of photovoltaic solar panels on top of it and to deposit it above the support structures set up in the field. In one example, the motorized carriage has a vertically movable upper platform, configured to take on itself the array of photovoltaic solar panels and to place it on the aforesaid supporting structures arranged in the installation field. In a different example, the motorized carriage is equipped with a lifting device configured to pick up, lift and deposit the array of photovoltaic solar panels.

The method and the system described above achieve a series of important advantages.

In the first place, the system according to the invention envisages that the robot that is used for assembling the photovoltaic solar panels operates in a transportable station located adjacent to the installation field in the manner of a temporary factory. The robot, therefore, does not move along the installation field during the installation operation. This allows significant reduction of the complexity of the system.

Secondly, the station above which the robot is located in position is transportable and therefore easily repositioned whenever it is necessary to move to a new installation field (this is the meaning of the term temporary factory used here). Furthermore, the robot is used not only to install the photovoltaic solar panels on their support framework, but also primarily to assemble the support framework. The system according to the invention therefore operates according to a different philosophy with respect to the previously mentioned known system, i.e. it uses the robot to assemble the support framework and to place the photovoltaic solar panels on the support framework, leaving the robot in a station, after which the array of photovoltaic solar panels thus assembled is transported, with the aid of a motorized carriage (preferably of a type controlled by an operator external to the carriage), to the place of installation, where the support framework is mounted on supporting structures previously prepared on the installation field. Again, this method of proceeding makes it possible to considerably simplify the system with respect to known systems. In the preferred embodiment example, the robot operates in cooperation with operators assigned to complete the installation operations. This again makes it possible to drastically simplify the structure and control of the system, since the robot simply has to temporarily assemble the components of the support framework together and temporarily place and position the photovoltaic solar panels on the aforesaid support framework. The components of the supporting framework are temporarily retained on said auxiliary support frame, which is configured with supporting and/or containment elements or walls configured to locate the aforesaid components into position. In this way, the quality of the installation is also improved, because any shape (or geometric) defects of panels and components are immediately detected because they do not fit in the auxiliary support and containment frame wherein the robot positions the components.

In the system according to the invention, it is the operators who then manually complete the connection operations of the components making up the support frame and the photovoltaic solar panels on the support framework. Another important advantage of the invention lies in the fact that the base structure of the station on which the robot is arranged also acts as a support and reference structure for both the piece-holder containers from which the robot picks up the elements and components to be assembled, and for the bench with the relative section of the conveying line serving to support and advance the auxiliary frame on which the support framework of the photovoltaic solar panels is assembled. This again makes it possible to considerably simplify the system, since both the robot and all the elements of the system that cooperate with the robot are located in position with respect to said base structure. When the station is transported to a new operating site, all the system components, therefore, always remain located in the aforesaid base structure, without requiring any adaptation or modification of the robot control software. This also applies to the transport system which causes the advancement of the aforesaid auxiliary support frame on which the support framework of the photovoltaic solar panels is assembled.

Another important advantage of the system according to the invention lies in the fact that the array of photovoltaic solar panels assembled in said station is transported, after the completion of the assembly operations by the operators, to the installation site by means of a motorized carriage, which takes on itself the array of photovoltaic solar panels with its support framework and places it on the supporting structures set up in the field. In the preferred embodiment, the connection operation between the support framework of the photovoltaic solar panels and the supporting structures arranged in the field is performed and/or completed manually by operators in the field.

BRIEF DESCRIPTION OF THE DRAWINGS

Further characteristics and advantages of the invention will become apparent from the description that follows with reference to the attached drawings, provided purely by way of non-limiting example, wherein:

FIG. 2A is a view on an enlarged scale of a detail of FIG. 2;

FIG. 2C shows an enlarged detail of FIG. 2B;

FIG. 3 is a plan view illustrating the assembly station of the array of photovoltaic solar panels, with reference to the solution of FIG. 2;

FIG. 4 is a cross-sectional view, on an enlarged scale, according to the line IV-IV of FIG. 3;

FIGS. 6-22 are schematic plan views showing different steps of the operation of the system according to the invention.

DETAILED DESCRIPTION

Figure 1:
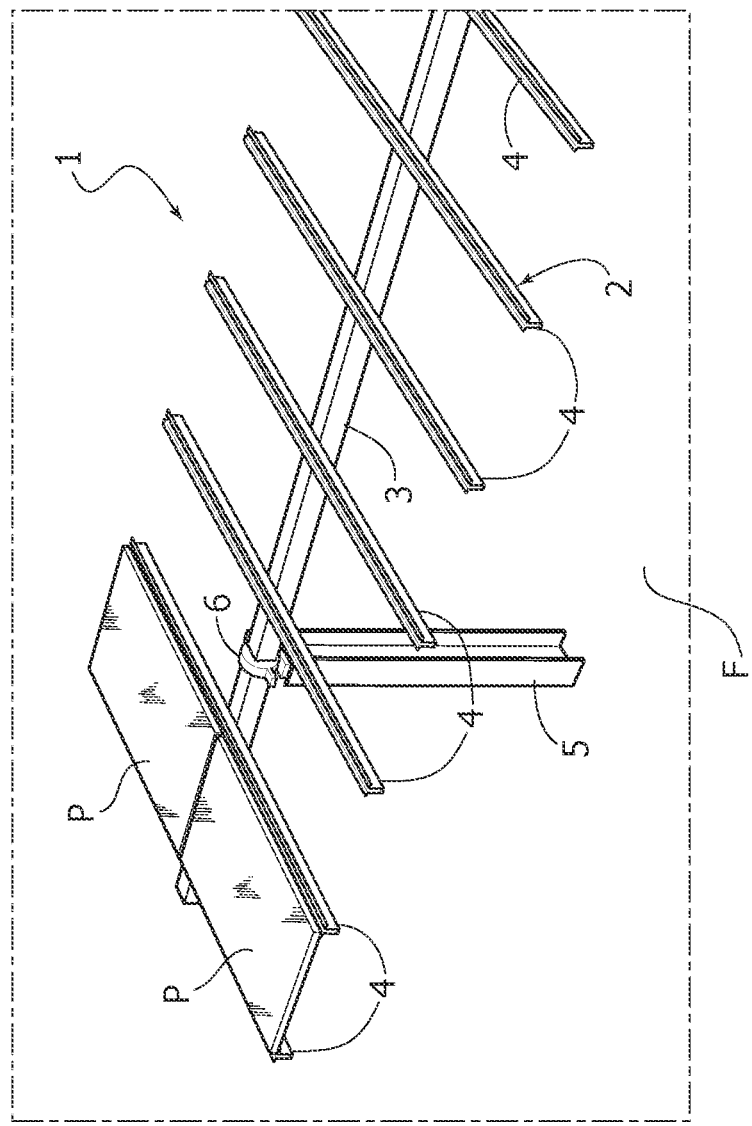
FIG. 1 is a partial perspective view of an array of photovoltaic solar panels installed on a field, with most of the panels removed, to show the support framework on which the photovoltaic solar panels are mounted.

In FIG. 1, the reference number 1 indicates—in its entirety—an array of photovoltaic solar panels P installed in a field F. The photovoltaic solar panels P are mounted on a support frame 2, which—in the illustrated example—includes a longitudinal beam 3 arranged horizontally, and a plurality of cross-members 4 rigidly connected to the longitudinal beam 3, for example, by means of screws. The photovoltaic solar panels P are—in turn—rigidly connected to the cross-members 4, by any means of connection, for example by riveting. FIG. 1 shows only two panels P in the assembled condition, in order to make the support framework 2 visible.

In the method according to the invention, the array of photovoltaic solar panels 1 is assembled at a distance from the place of installation, by assembling together the components 3, 4 that constitute the support framework 2 and mounting the photovoltaic solar panels P on the support framework 2. Once assembled, the structure is transported, in the way that will be illustrated below, to the installation site where it is mounted on supporting structures previously prepared in the field F. Typically, the support structures of the array of photovoltaic solar panels that are arranged on the field F include a plurality of poles 5 (only one of which is visible in FIG. 1), which are arranged on the field F in mutually spaced-apart positions and distributed along several parallel and spaced-apart rows (see also FIGS. 21, 22). The longitudinal beam 3 is connected to the top of each pole 5 with the interposition of a support device 6, made in any known way, in order to give the longitudinal beam 3 the possibility of being rotated around its longitudinal axis to orient the photovoltaic solar panels P during the day to track the apparent movement of the sun.

In the illustrated example, at each pole 5, the beam 3 is clamped between a lower half-ring and an upper half-ring, which are rigidly connected to each other, for example, by means of screws. The lower half-ring is part of a tracking device/tracker, which is inserted in the upper end of the pole 5 and which includes an electric motor to impart a rotation around the longitudinal axis of the beam 3 to the aforesaid lower half-ring. The oscillation movement imparted to the lower half-ring is transmitted to the longitudinal beam 3, which is rigidly clamped between the lower half-ring and the upper half-ring constituting the support device 6.

As already indicated above, the method according to the invention comprises a first assembly step of the array of photovoltaic solar panels 1, which is performed with the aid of a robot R (FIG. 2) in a transportable station S1 located adjacent to the installation field F. The aforesaid first assembly step comprises assembling the support framework 2 and assembling the photovoltaic solar panels P on the support framework 2.

The station S1 for carrying out the first assembly step includes a transportable base structure B (FIG. 2), on which the robot R is mounted and located in position.

In the illustrated example, the base structure B is a platform mounted on the platform 7 of an industrial vehicle 8, for example, a semi-trailer truck. However, this solution is illustrated here purely by way of example, since it is clear the possibility of adopting any alternative solution that allows—in any case—easy movement of the station S1 whenever it is necessary to operate in a different installation field. For example, the base structure B could be a palletizable platform configured to be lifted and loaded onto a transport vehicle of any type.

On the base structure B, adjacent to the robot R, a stationary bench 9 is located in position and fixed, which supports a section of the conveying line 10 for the auxiliary support structure 11 serving to assemble the aforesaid support frame 2 of the photovoltaic solar panels P thereon, and to subsequently allow assembling the photovoltaic solar panels P on the support frame 2 thus assembled.

Figure 2:
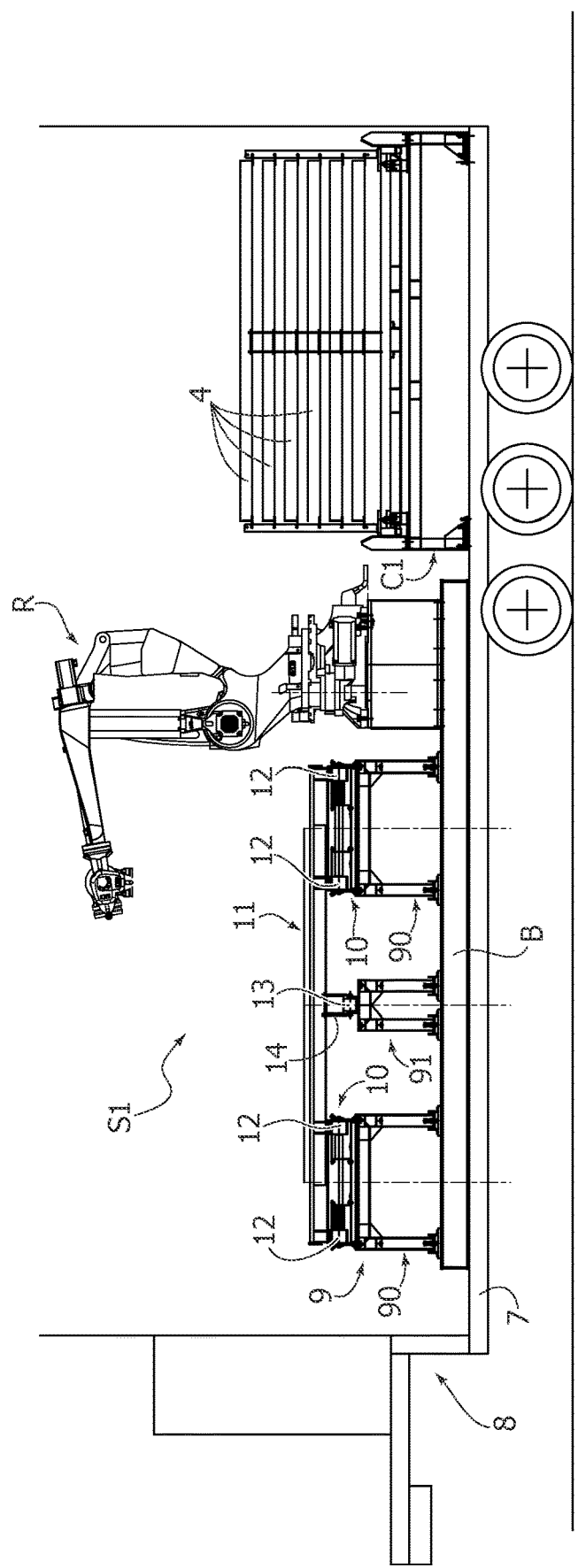
FIG. 2 is a cross-sectional, elevational view of an embodiment example of a station for assembling the array of photovoltaic solar panels intended to be installed in the field.

With reference to FIGS. 2 and 2A, in the illustrated example, the bench 9 mounted on the base structure B includes two side structures 90 and a central structure 91, which support and guide the movement of the auxiliary support structure 11 along a longitudinal horizontal direction X (see FIG. 3), which is perpendicular to the longitudinal direction of the vehicle 8.

On the base structure B, one or more piece-holder containers are also mounted and referenced in position, prepared with pieces and components that are picked up by the robot R and assembled together to form the support framework 2, and which contain the photovoltaic solar panels P to be mounted on the support frame 2. In the example of FIGS. 2, 3, a container C1 is shown for the cross-members 4 intended to constitute the frame 2 and two containers C2 for the photovoltaic solar panels P. FIG. 3 also shows an area C3 for removing the longitudinal beams 3 to be used to constitute the supporting frame 2 of each array of photovoltaic solar panels.

The auxiliary support structure 11 on which the array of photovoltaic solar panels is assembled is in the form of a horizontal auxiliary frame, which is advanced along the conveying line section 10, above the bench 9 carried by the base structure B, to bring in succession different portions of the auxiliary frame 11 adjacent to the robot R and to allow the assembly on the auxiliary frame 11 by the robot R of the support framework 2 and the mounting of the photovoltaic solar panels P on the support framework 2.

In the example illustrated in the attached drawings, the system provides a series of auxiliary support frames 11 (in this specific case two frames 11 are provided) aligned with each other in the longitudinal direction X and connected in a removable way, which can be positioned in succession above the bench 9 carried by the base structure B of the station S1, to allow the assembly on each auxiliary frame 11 of a respective array of photovoltaic solar panels. The conveying line section 10 comprises a support and guide device, carried by the bench 9, to support and guide a movement of the auxiliary frame 11 in the longitudinal horizontal direction X, and an actuation device carried by the bench 9, to activate a movement of the auxiliary frame 11 along the longitudinal horizontal direction X. In the illustrated example, the support and guide device comprises a plurality of rollers or wheels 12 rotatably mounted on the structure of the bench 9. Again in the case of the specific example illustrated, at least some of the rollers or wheels 12 are motorized, so that they also act as a device for activating the movement of the auxiliary frame.

In the case of the specific solution illustrated in FIGS. 2 and 2A, each of the two side structures 90 forming part of the bench 9 supports a section of the conveying line 10 including motorized rollers 12. The central structure 91 forming part of the bench 9, on the other hand, carries freely rotatable rollers 13 for supporting and guiding a lower longitudinal rib 14 of the auxiliary frame 11.

Of course, the specific configuration of the conveying line section provided in the station S1 may also be completely different from that illustrated in FIGS. 2-4 purely by way of example, in accordance with any known type of conveyor system. The important concept envisaged in the present invention consists in the fact that both the supporting structures and the conveying system are parts carried by the same base structure B, easily transportable, on which the robot R is also mounted, which must perform the assembly operation and on which the containers C1, C2 are also mounted, carrying at least part of the components necessary for assembling the array of photovoltaic solar panels. In this way, both the support and guiding system of the auxiliary frame 11, as well as the robot and the remaining components mentioned above are all referenced in position with respect to the same base structure B, which allows simple and facilitated programming of the electronic control of the robot R, and to ensure the accuracy of assembly operations without the need to use complex systems, for example, vision systems to assist the robot and to greatly simplify the robot control software.

Figure 2B:
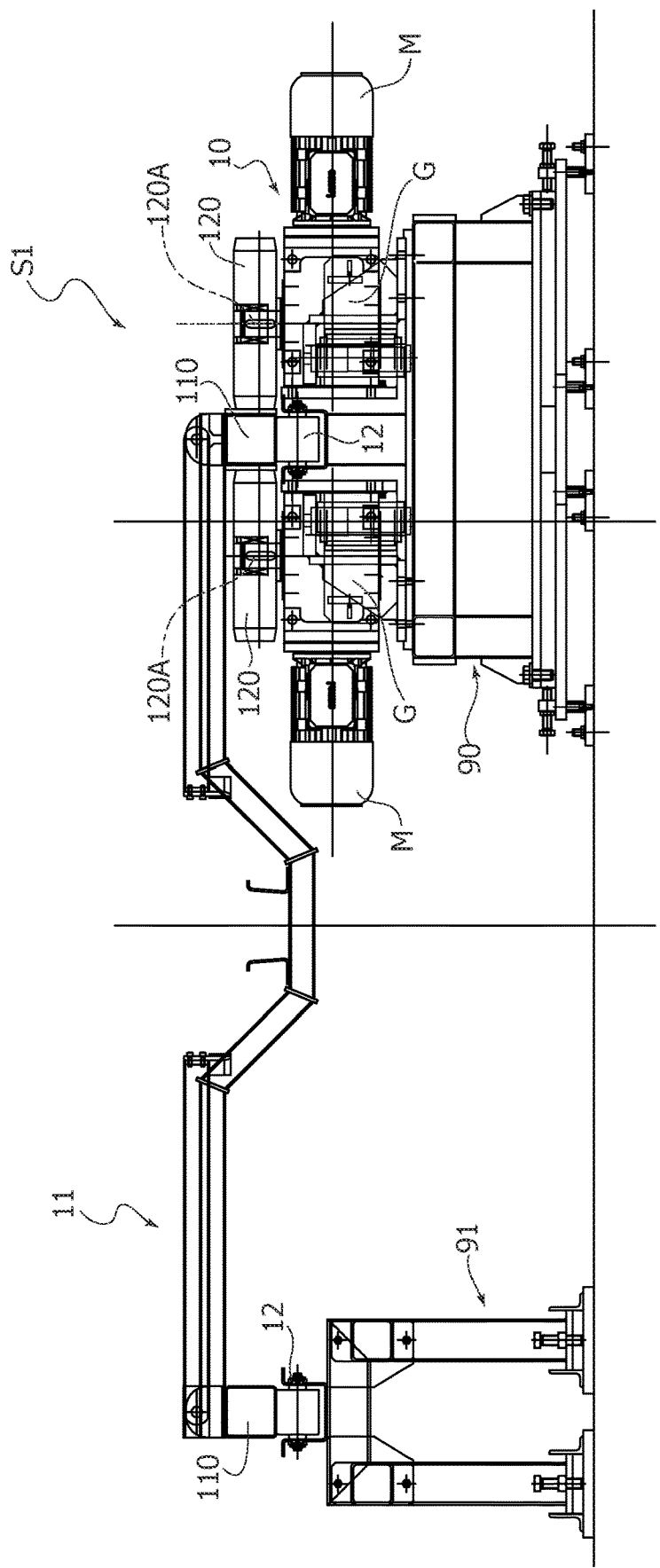
FIG. 2B shows a variant of FIG. 2A.
Figure 2D:
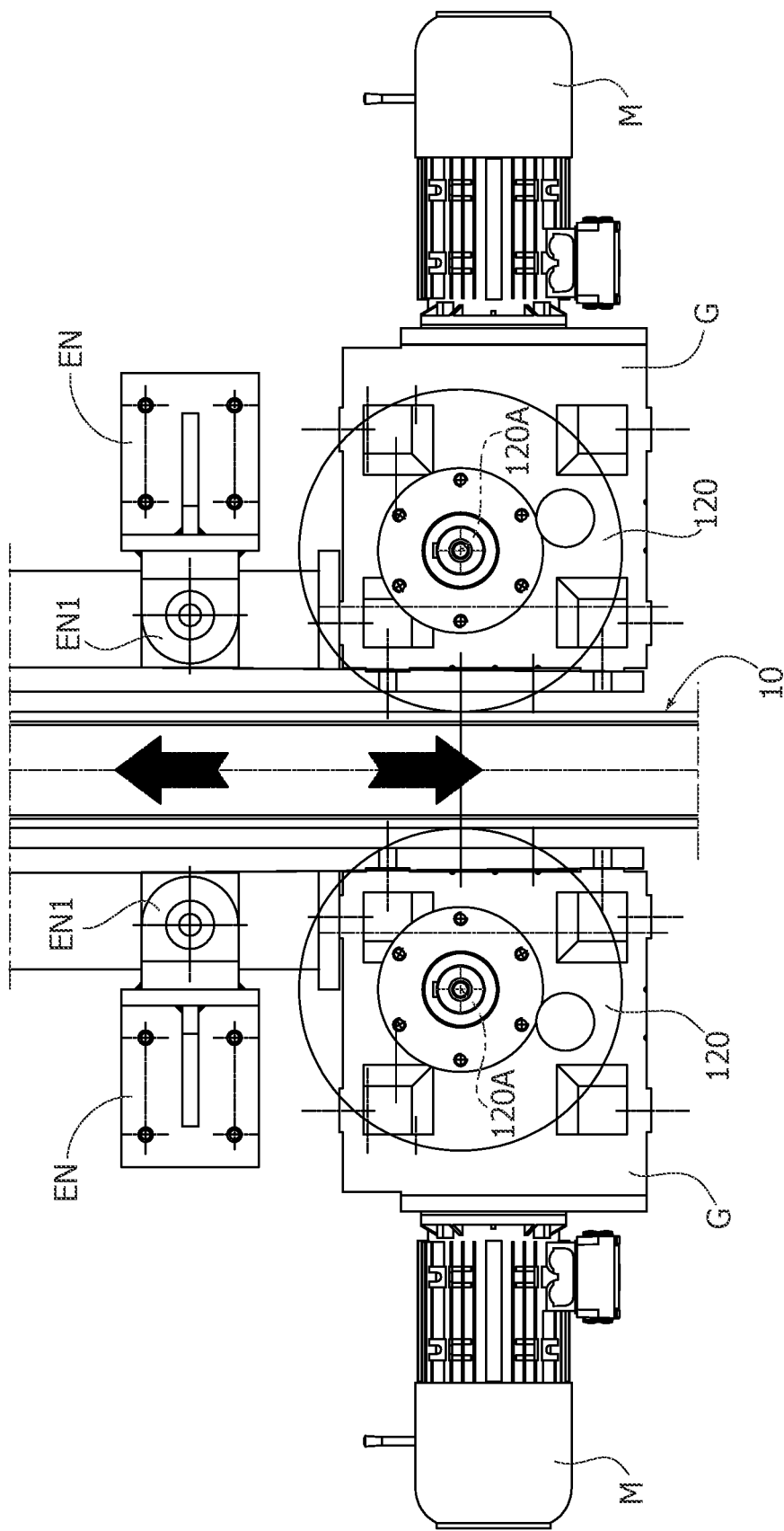
FIG. 2D is a plan view of the detail of FIG. 2B.

FIGS. 2B, 2C and 2D show an alternative form of construction. In these Figures, the parts corresponding to those of FIGS. 2, 2A and 3 are indicated by the same reference numbers. In the variant of FIGS. 2B, 2C and 2D, the bench carried by the base structure B of the station S1 includes a main structure 90 and an auxiliary structure 91 carrying aligned series of rollers 12 freely rotating around respective axes that are horizontal and transverse with respect to the direction of transport X (shown in FIG. 3). The rollers 12 support and guide the movement of the auxiliary support frame 11. To this end, the frame 11 includes two longitudinal beams 110, arranged on the two sides of the frame 11 and under it, which rest on the rollers 12. The system for actuating the movement of the frame 11 is associated with the structure 90 and includes two electric motors M which drive, by means of gearbox assemblies G, the rotation of two wheels 120 about respective vertical axes 120A. The two wheels 120 are in frictional engagement with the side walls of one of the two side longitudinal beams 110 forming part of the frame 11 (see in particular FIGS. 2C and 2D), so that their rotation causes the frame 11 to advance in the transport direction X. With reference again to FIG. 2D, the side walls of the longitudinal beam 110 forming part of the frame 11, which is engaged by the wheels 120 are also engaged, in a longitudinally spaced-apart position with respect to the wheels 120, by wheels EN1 connected by a transmission (not illustrated) of any known type to two encoder devices EN, which are thus able to monitor the position of the frame 11 during its movement in the transport direction X.

On the vehicle 8 there is a cabinet 80 containing the electronic controller of the robot 81, as well as electric batteries for powering the robot and the actuating motors of the rollers 12 of the conveying line section 10.

The electronic control of the robot 81 is configured and programmed to control the robot R and to control the actuating device of the movement of the auxiliary frame 11. In particular, the electronic controller 81 causes advancement of the auxiliary frame 11 up to an operating position wherein the robot R assembles the support framework 2 of the photovoltaic solar panels on the frame 11 and then positions the photovoltaic solar panels P above the support framework 2 thus assembled.

In the example illustrated, the electronic controller 81 is configured to advance the auxiliary frame 11 in steps, to allow the robot R to carry out assembling the support framework 2 and the photovoltaic solar panels P step by step, on different portions of the supporting auxiliary frame 11. In the case of the illustrated example, which provides two auxiliary frames 11 arranged in series (in a variant, the two frames 11 are part of a single slide), the system is configured to assemble—in succession—on different portions of the two auxiliary frames 11 different portions of the respective support frameworks 2 and the photovoltaic solar panels P associated therewith.

The bench 9 carried by the base structure B of the station S1 is also provided with a reference device of any known type (not illustrated) for referring the auxiliary support frame 11 to a predetermined position after each step of its movement. For example, this reference device may be constituted by a shutter device, consisting of a mobile engagement element (for example, a pin), which selectively engages in one of a plurality of longitudinally spaced-apart openings arranged on the auxiliary support frame 11. Alternatively, it is possible to use one or more EN encoder devices, as illustrated with reference to the example of FIG. 2D). Still alternatively, the use of a laser reader can be envisaged to detect a bar code or QR code carried by the frame 11.

With reference to FIGS. 3, 4, upstream and/or downstream of the bench 9 (with reference to the advancement direction of the auxiliary support frames 11), an independent support structure 15 is provided, including a series of portal structures 150, aligned together, and spaced-apart along the X direction and connected by upper longitudinal arms. The structure 15 is provided with a support and guide device for the auxiliary frames 11. With reference to FIG. 4, each portal structure 150 includes two uprights 151, which rest on the ground, in the example illustrated by means of wheels 154. The uprights 151 are connected to each other by a cross-member 152 carrying freely rotatable rollers 16 for supporting and guiding the movement of an auxiliary support frame 11.

In the embodiment illustrated here, each support frame 11 is configured with supporting and/or containment elements or walls of any type (not illustrated) to hold thereon (in a condition of temporary connection) both the components of the support framework 2 of the array of photovoltaic solar panels, which are placed on the auxiliary frame 11 by the robot R, and the photovoltaic solar panels P, which are placed on the support framework 2 by the robot R. To this end, the frame 11 may include, for example, peripheral walls and internal walls that define support and containment spaces for the components of the frame 2 to be assembled, and the photovoltaic solar panels P.

Downstream of the station S1, where the independent support structure 15 consisting of portal structures 150 is provided, there is a station S2, adjacent to the station S1, where the connection of the components and the photovoltaic solar panels P is completed manually by operators. In particular, the operators envisage, for example, rigidly connecting the cross-members 4 to the longitudinal beam 3 (see FIG. 1) by screwing, and to rigidly place and connect the photovoltaic solar panels P on the cross-members 4 by riveting. These operations can be performed by the operators standing under the auxiliary support frame 11, since the latter is supported and guided in a raised position with respect to the ground (see FIG. 4).

In the example illustrated in FIG. 4, the portal structures 150 can be easily repositioned thanks to the wheels 154. Furthermore, the uprights 151 can be bent around articulation axes 153 to allow each portal structure 150 to be arranged in a configuration of reduced bulk, for transport.

In order to hold in position the elements constituting the support framework 2 and the photovoltaic solar panels P, each auxiliary support frame 11 may be arranged with support and reference elements, which allow the components to be held loosely, in a relatively correct position, until they are positioned in a precise way, and rigidly connected to each other by the operators in the station S2. In this way, the control system of the assembly can be further simplified, since the robot does not need to ensure extremely precise positioning.

Figure 5:
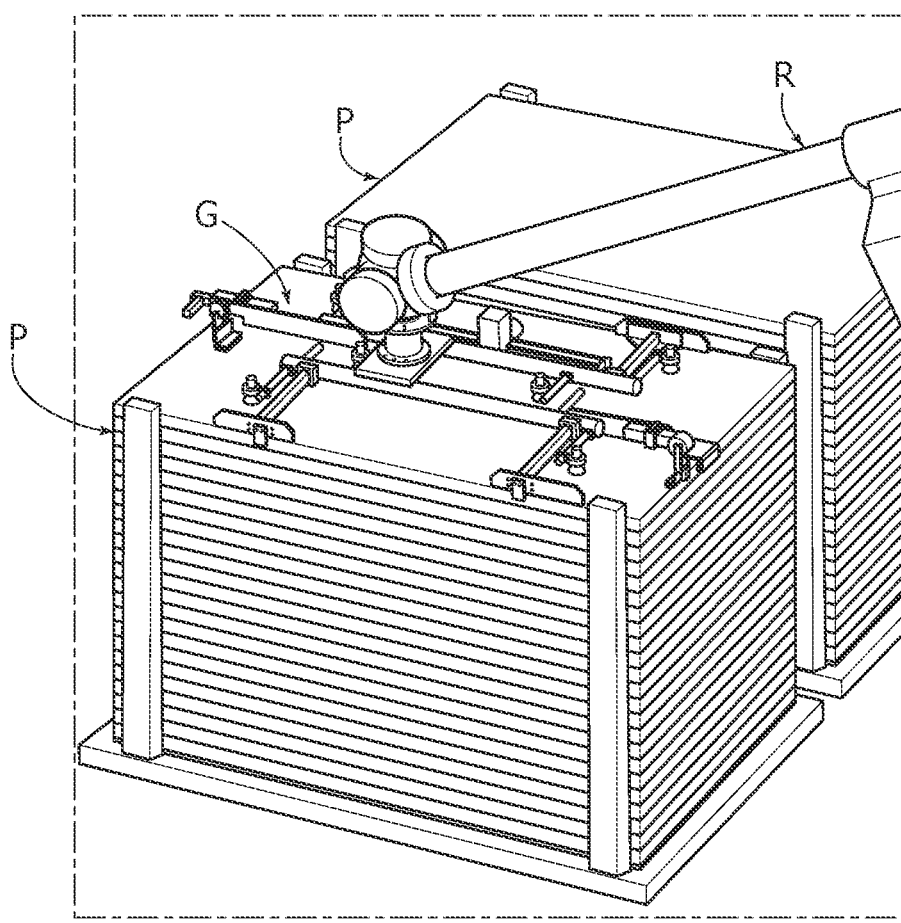
FIG. 5 is a perspective view showing an embodiment example of a gripper used by the robot of the system according to the invention to mount the photovoltaic solar panels.

FIG. 5 of the attached drawings shows, by way of example, a gripper G with which the robot R may be provided, to pick up, support and deposit the photovoltaic solar panels P.

FIGS. 6-22 are schematic plan views showing different steps of the operation of the system according to the invention. In these Figures, the parts corresponding to those illustrated in FIGS. 1-4 are indicated by the same reference numbers.

Figure 6:
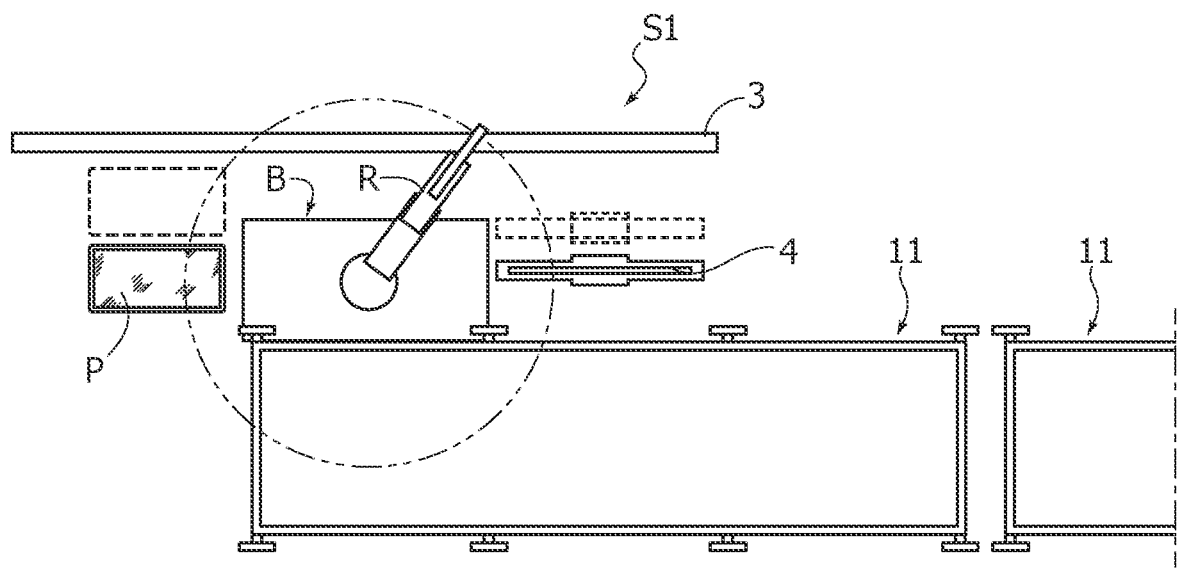
Figure 7:
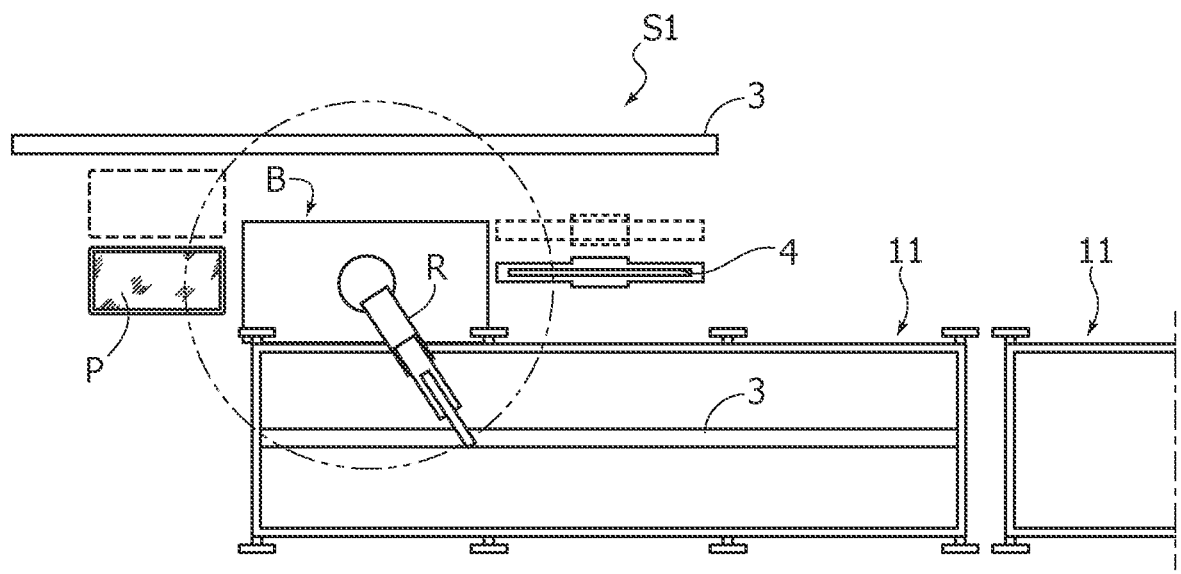
Figure 8:
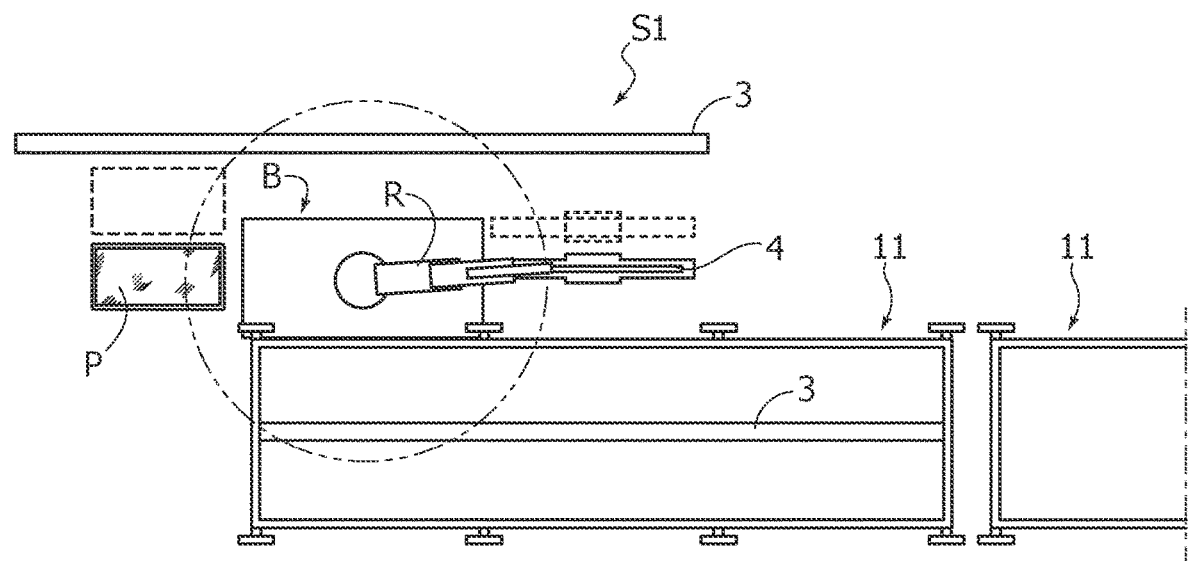
Figure 9:
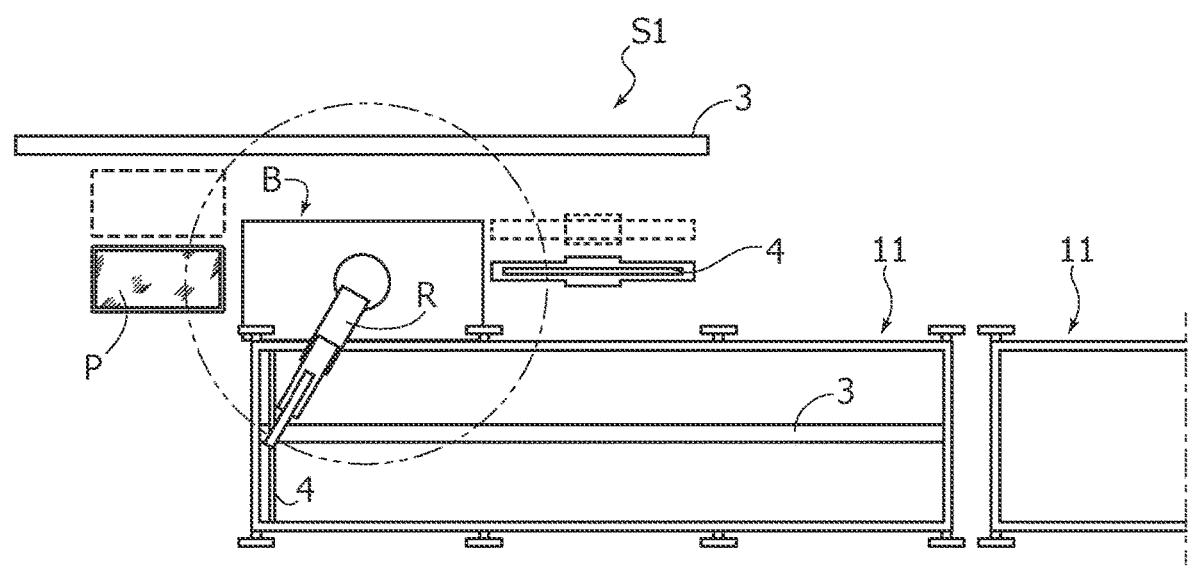
Figure 22:
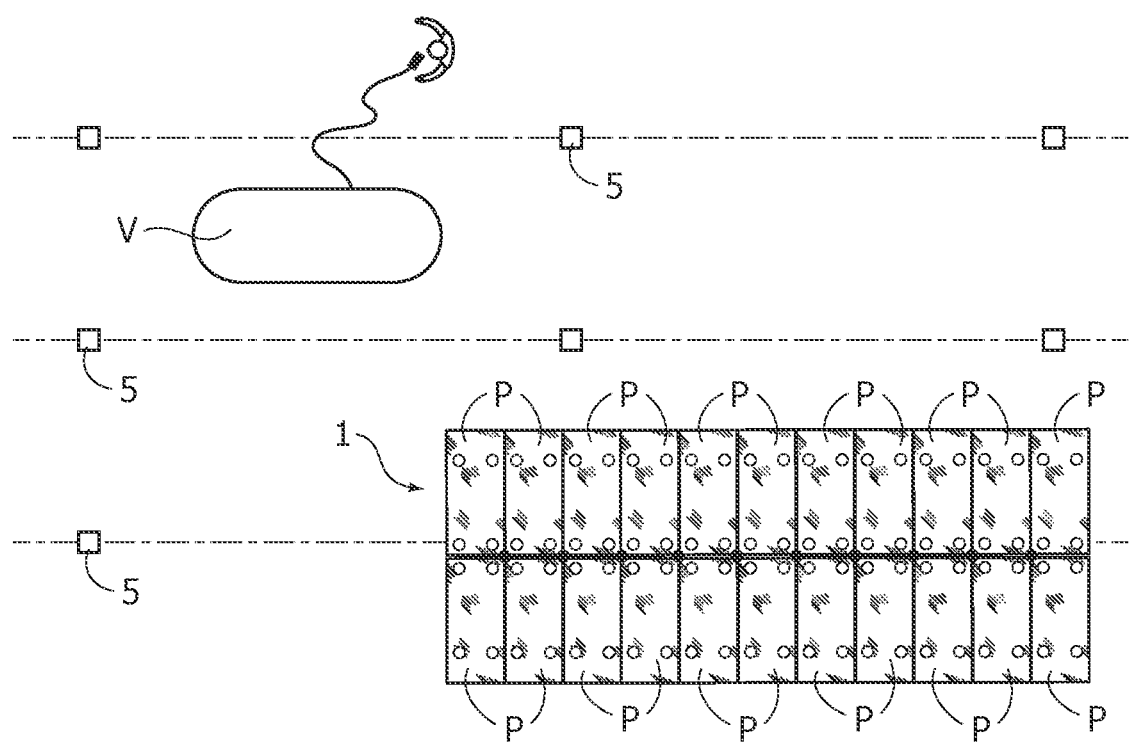

FIG. 6 illustrates the beginning of the assembly operation of the support framework 2 of an array of photovoltaic solar panels on a first auxiliary support frame 11. FIG. 6 illustrates the condition wherein the first of the two auxiliary support frames 11 has its front end positioned adjacent to the robot R in station S1. With reference to FIGS. 6, 22, the advancing direction of the auxiliary support frames 11 is from right to left. Furthermore, in the condition illustrated in FIG. 6, both the auxiliary support frames 11 are still "empty", and the robot R is in a suitable position for picking up a longitudinal beam 3 intended to constitute the support framework 2 to be assembled on the first auxiliary frame 11. FIG. 7 shows the robot R in the position wherein it has placed the longitudinal beam 3 picked up in the step of FIG. 6 above the first auxiliary frame 11. FIG. 8 shows the robot R which, after having deposited the longitudinal beam 3 over the first auxiliary frame 11, is picking up a first cross-member 4 to be mounted above the beam 3. FIG. 9 shows the robot R in the position where it places the cross-member 4 on top of the beam 3. As already indicated above, in the preferred embodiment example, each auxiliary support frame 11 is provided with support and reference elements, which allow the beam 3 and the cross-members 4 to be held in position, without the need for a rigid connection between these elements. Therefore, the robot R leaves the beam 3 and the cross-members 4 in a condition of loose, temporary connection, the connection operation between these components being then carried out manually by the operators in the station S2.

Figure 10:
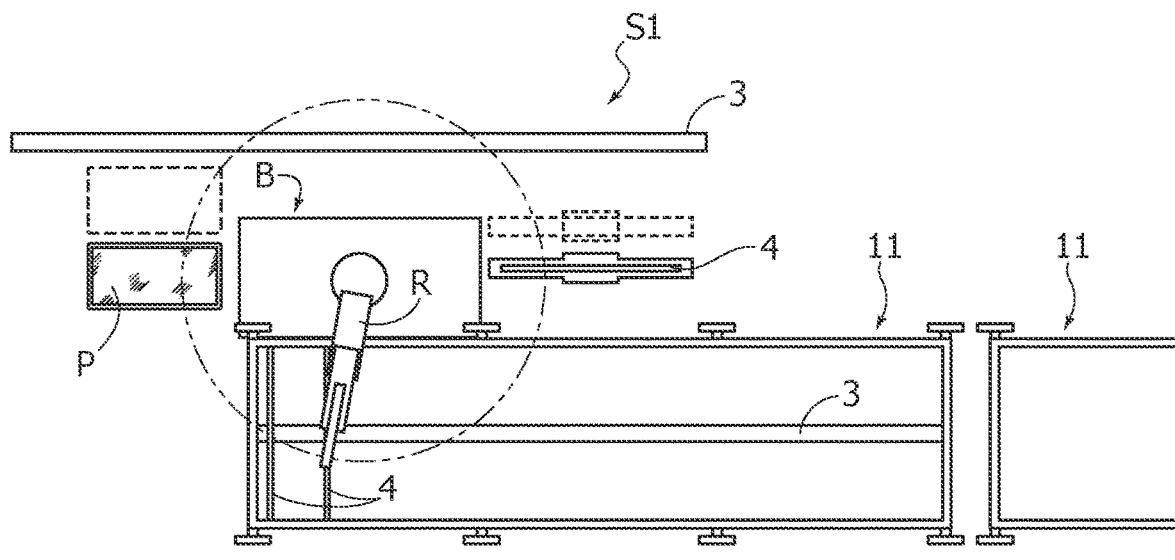
Figure 11:
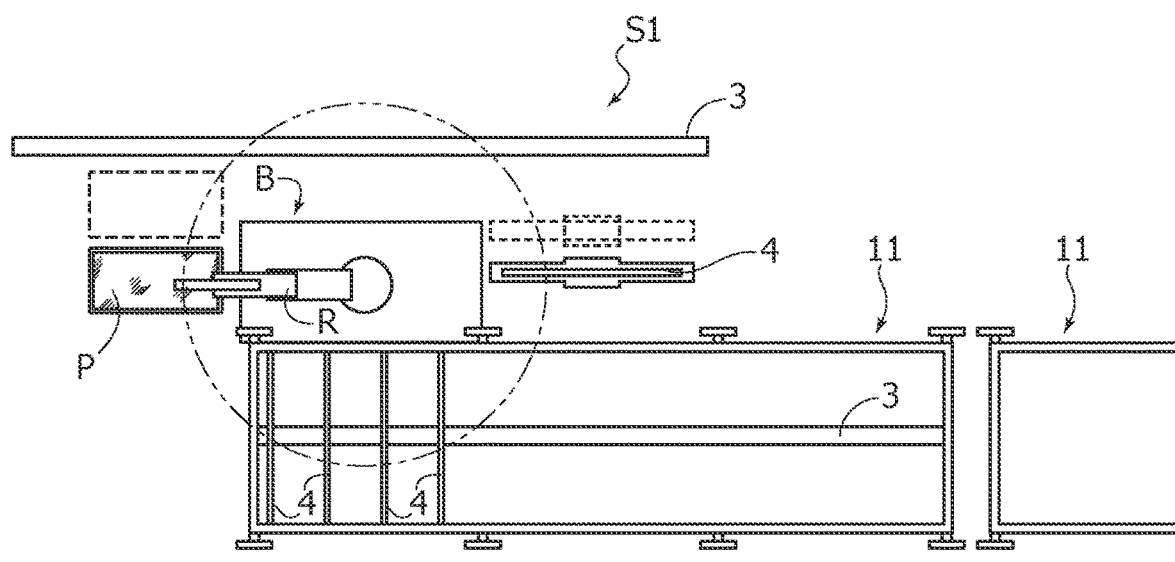

FIGS. 10, 11 show the robot while it positions four different cross-members 4 in succession and prepares to pick up a photovoltaic solar panel P.

Figure 12:
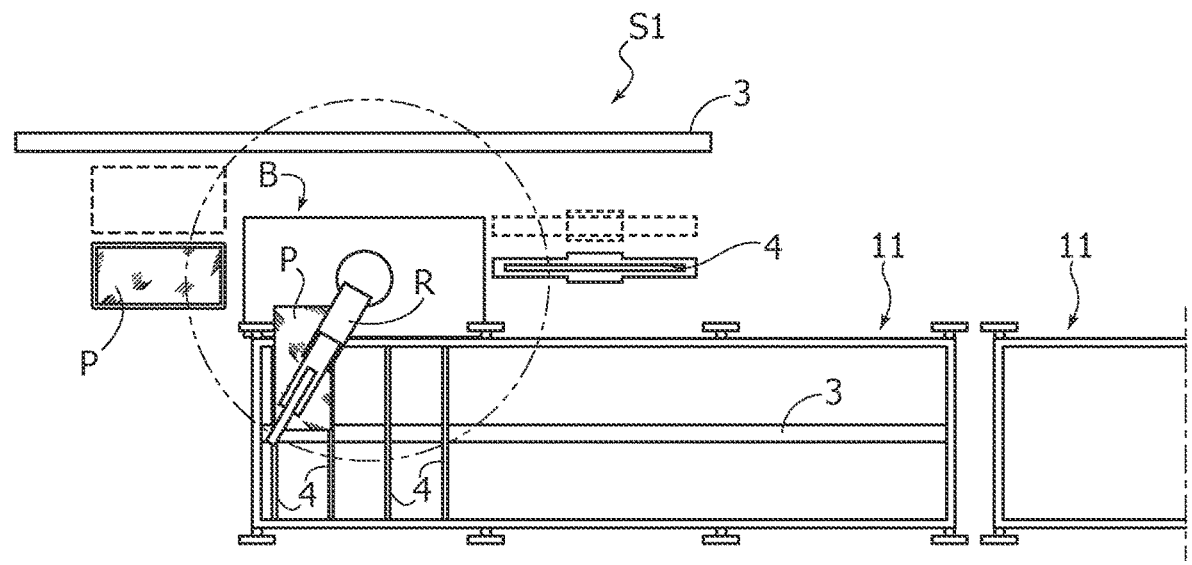
Figure 13:
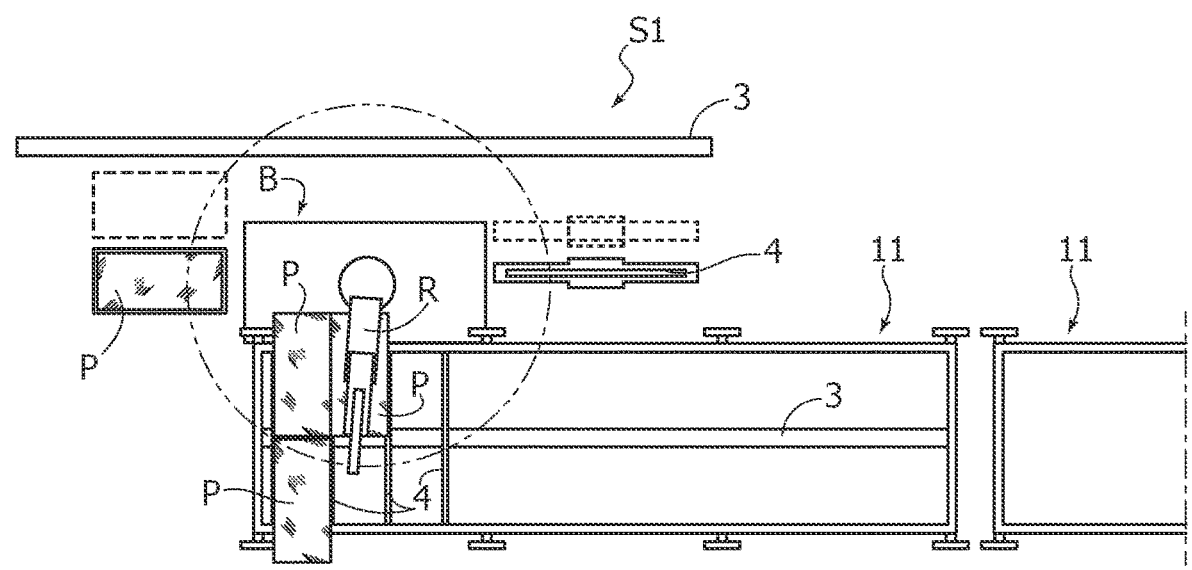
Figure 14:
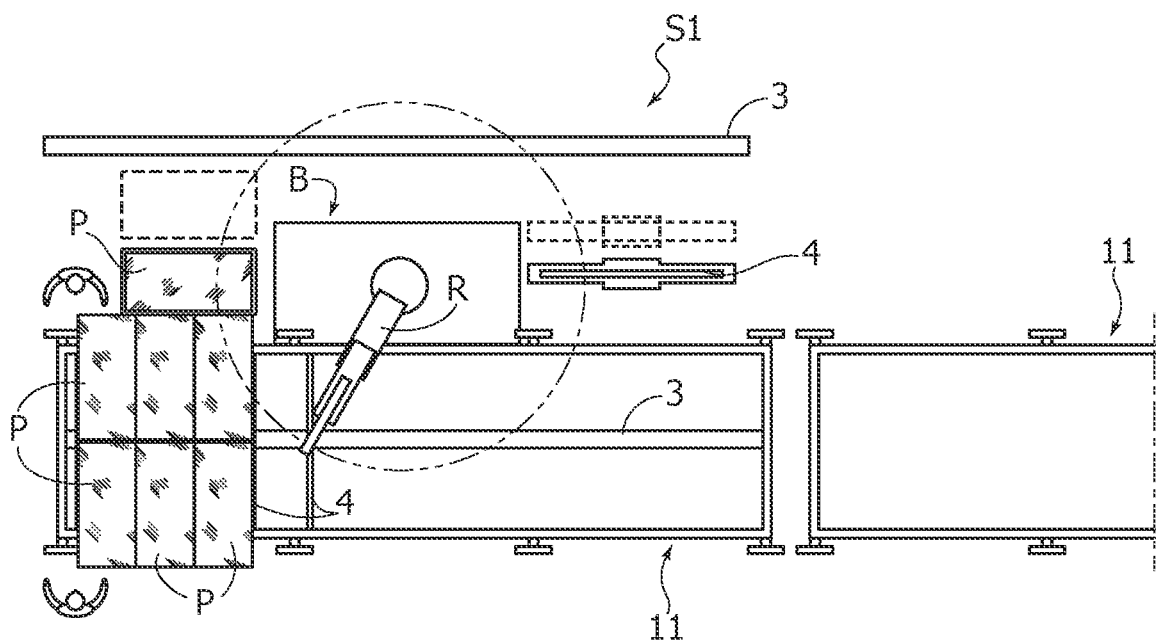
Figure 15:
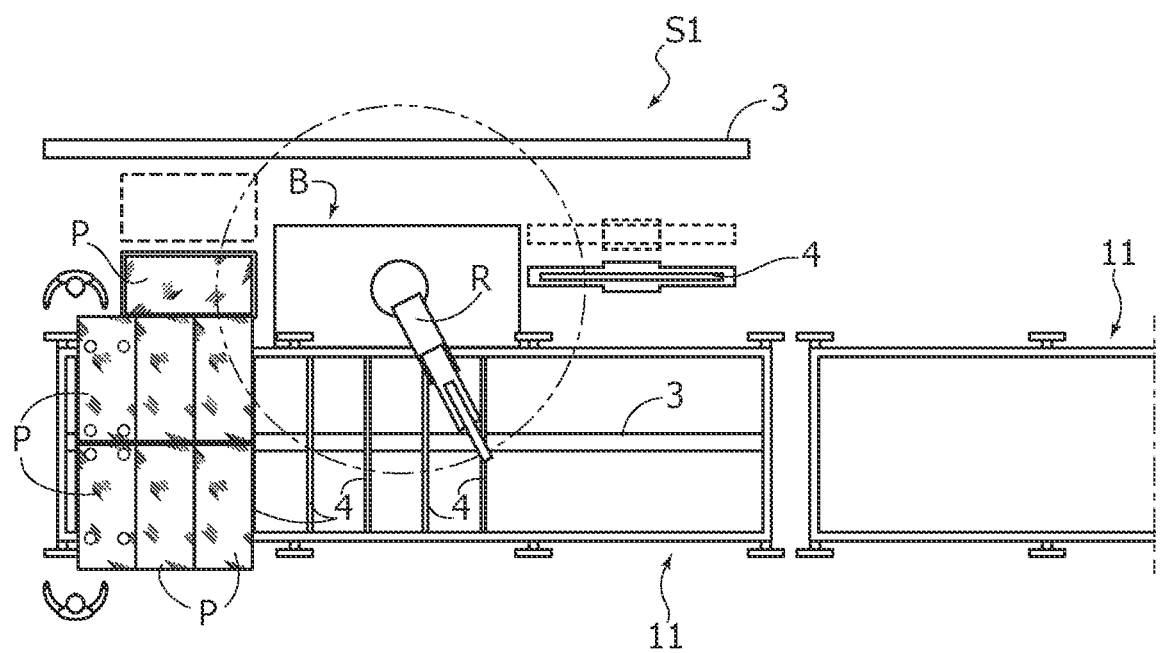
Figure 16:
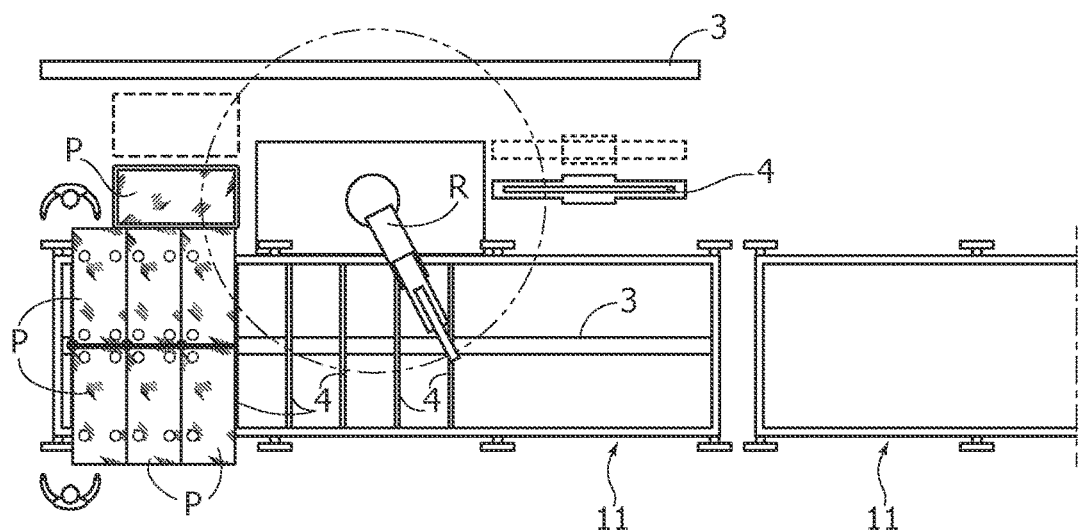
Figure 17:
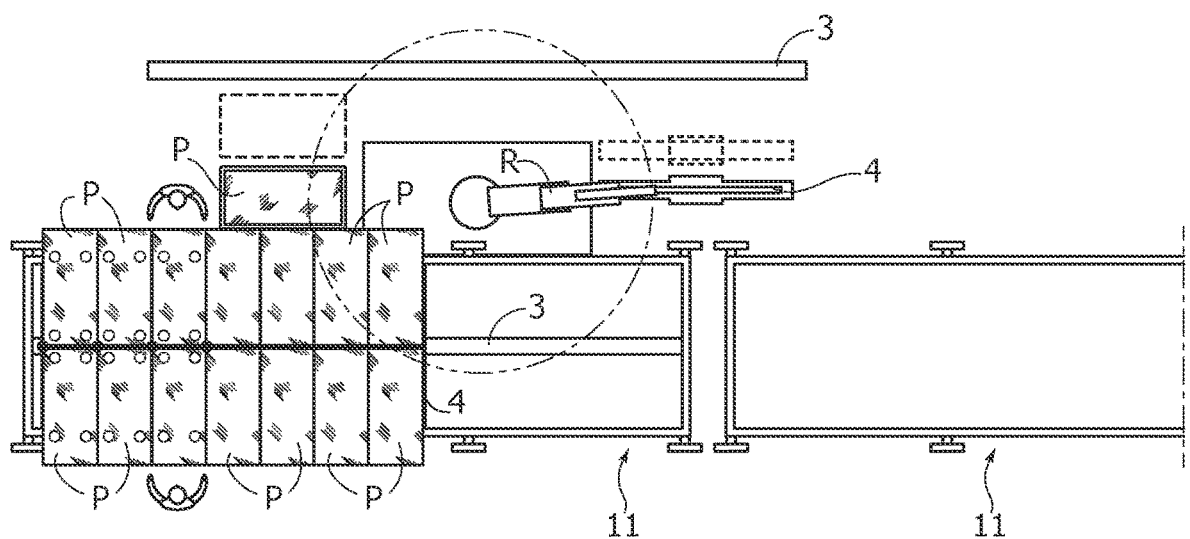
Figure 18:
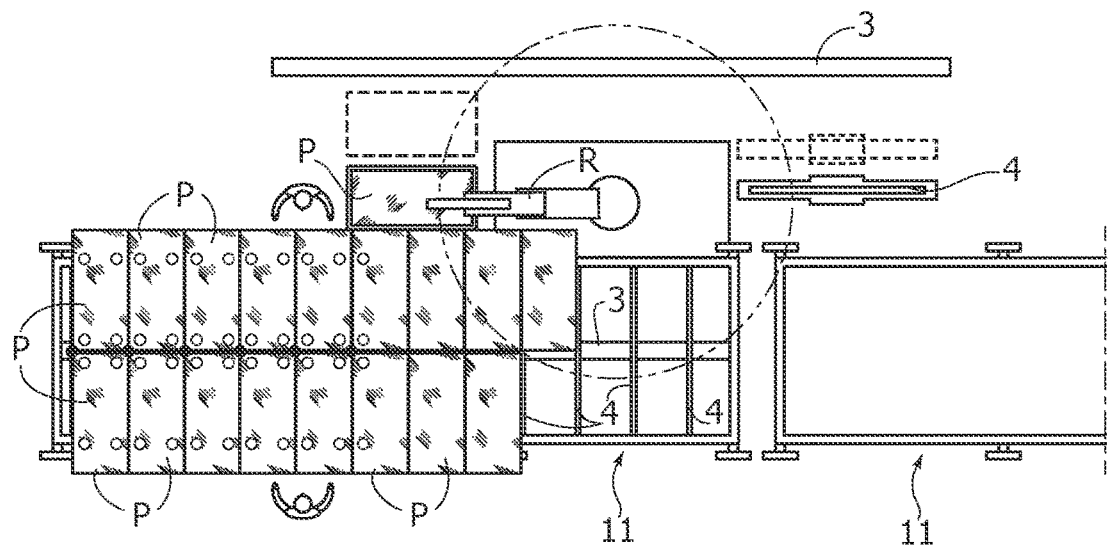
Figure 19:
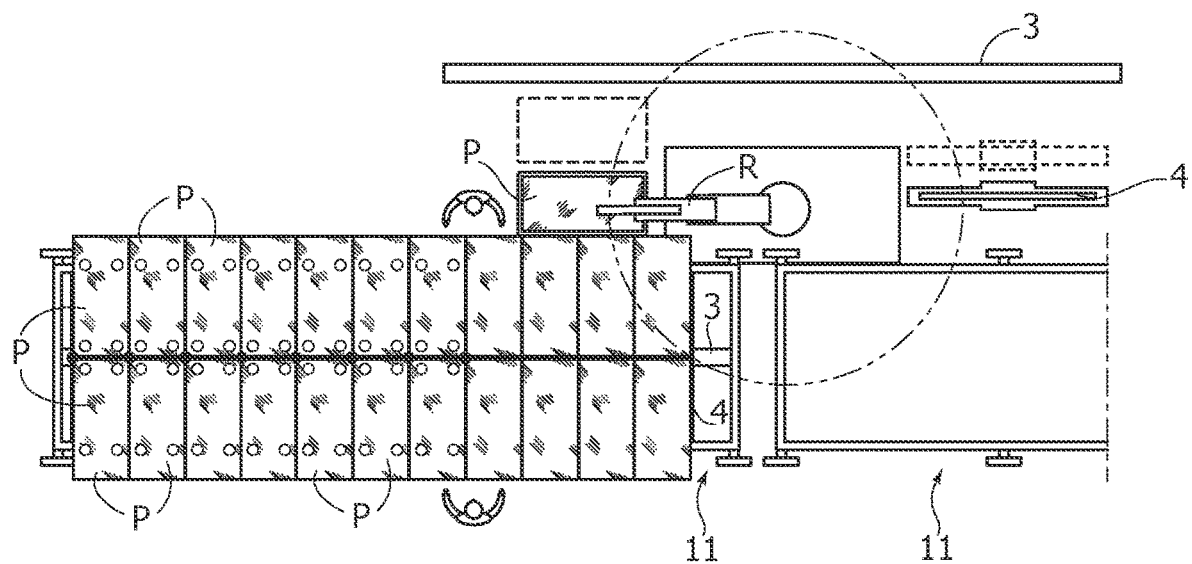

FIG. 12 shows the robot R in the position wherein it deposits the previously picked-up photovoltaic solar panel P over the first two cross-members 4 of the support framework deposited above the auxiliary frame 11. FIGS. 13, 14 show the robot R while it is positioning additional photovoltaic solar panels P. In the passage from the condition of FIG. 13 to the condition of FIG. 14, the device for activating the movement of the auxiliary frames 11 has completed a step forward by two auxiliary frames 11, in such a way that the first series of six solar panels P previously deposited on the cross-members 4 is located at the station S2, where the operators perform and/or complete the assembly, for example, by screwing the cross-members 4 on the beam 3 and by riveting the photovoltaic solar panels P on the cross-members 4. FIG. 15 shows that while the operators in the station S2 complete the assembly of the first series of panels P, the robot continues to assemble the support framework 2 over a second portion of the auxiliary frame 11. FIGS. 16, 17 show the robot R while it continues to deposit a new series of photovoltaic solar panels P on a second portion of the support framework 2, while in the station S2, the operators continue to carry out the screwing and riveting operations necessary to give rigidity to the structure of the array of photovoltaic solar panels. FIGS. 18, 19 show the robot R while it completes the positioning of the photovoltaic solar panels on the remaining portion of the first auxiliary frame 11. The two auxiliary frames 11 are—in the meantime—advanced by a further step to allow the operators in the station S2 to start screwing and riveting operations on the last series of photovoltaic solar panels P positioned on the rear portion of the first auxiliary frame 11.

FIG. 20 shows that the first auxiliary frame 11 has moved to an advanced position with respect to the station S1, while the second auxiliary frame 11 has moved with its front portion to the side of the robot R, so that the robot R can start the operation of assembling the support framework 2 and depositing the photovoltaic solar panels P on the second auxiliary frame 11. FIG. 20 also shows that after the second auxiliary frame 11, a third auxiliary frame 11 is visible. According to the disclosure of the invention it is in fact possible to envisage any number of auxiliary frames.

It is possible to envisage that the frames 11 move longitudinally back and forth in the transport direction X to return to a starting position each time an assembly cycle is completed. Alternatively, a circulation system for the frames 11 may be provided.

FIGS. 20, 21 show that, in the method according to the invention, once an array of photovoltaic solar panels has been assembled in the stations S1 and S2, it is transported to the installation site in the field with the aid of a motorized carriage V.

In the illustrated example, the motorized carriage, without driver, may be, for example, of any known type used in industry and belonging to the category of so-called AGV or AMR vehicles. For example, the motorized carriage V may be a carriage equipped with motorized wheels and steering wheels with at least one electric motor for actuating the motorized wheels, at least one electric motor for actuating the steering of the steering wheels, an electric power supply battery and an electronic controller that receives instructions from the operator located outside the vehicle, for example, by wire or wirelessly. In the illustrated example, the operator walks adjacent to the carriage and accompanies it to the installation site.

Returning to the example illustrated in FIG. 3, the end part 20 of the support and guide structure arranged downstream of the stations S1 and S2 has a free central space intended to allow the insertion of the motorized carriage V under the transport plane of the array of photovoltaic solar panels. Once assembling the support framework 2 and assembling the panels P is completed in the station S2, the structure thus assembled can be advanced in the direction X (FIG. 3) out of the engagement above the respective auxiliary frame 11 and up to the final support station 20 having the central free space where the motorized carriage V can be inserted.

According to a first example, this carriage can be configured with a vertically-movable upper platform (not illustrated), operated by a lifting device of any known type (for example, a pantograph), so that it can be raised to lift the support framework 2 of an array of panels P above it, in order to transport it to the place of installation. The same operation can also be repeated for the array of photovoltaic solar panels which is assembled above the second auxiliary frame 11, after which (in the case of the example of FIG. 3) the train consisting of the two auxiliary frames 11 can be made to slide again backwards to a position wherein the cycle of operations necessary to assemble two new arrays of photovoltaic solar panels can be started again. In the case of a train of three or more auxiliary frames 11, a recirculation system of the empty auxiliary frames can be provided from the outlet of the station to the inlet of the station.

FIG. 21 shows the operator who guided the motorized carriage V with the photovoltaic solar panel structure loaded above it to the installation site. FIG. 22 shows that the operator with the motorized carriage V is moving away from the place of installation, after the array of photovoltaic solar panels has been deposited on the poles 5, according to the method that has already been described above with reference to the FIG. 1. In the place of installation, the assembly operations of the longitudinal beams 3 above the posts 5 are carried out manually by operators. For example, the devices 6 may be arranged with the upper half-rings initially removed, so as to allow the depositing of the longitudinal beam 3 of the support framework 2 above the lower half-rings of the devices 6. Subsequently, the operators mount the upper half-rings, connecting them rigidly to the lower half-rings, so as to rigidly clamp the longitudinal beam 3 between the lower half-rings and the upper half-rings, and thus allow the orientation of the longitudinal beam 3 to be controlled around its longitudinal axis by the tracking device or tracker arranged in some of the poles 5.

Once the array of photovoltaic solar panels has been deposited in the place of installation, the operator who controls the movement of the motorized carriage V can bring the carriage back to the stations S1, S2 to prepare it to pick up a new array of photovoltaic solar panels assembled in the meantime.

As can be seen, therefore, the system according to the invention achieves an ideal compromise between the need for rapid and automatic installation of the photovoltaic solar panels as much as possible, and at the same time the need to reduce the complexity and cost of the system as much as possible.

Of course, without prejudice to the principle of the invention, the details of construction and the embodiments may vary widely with respect to those described and illustrated purely by way of example, without departing from the scope of the present invention, as defined by the attached claims.

The invention claimed is:

1. A method for assembling and installing arrays of photovoltaic solar panels in an installation field, comprising:
    assembling an array of photovoltaic solar panels on a transportable station having a transportable base structure, the transportable station is configured to be positioned stationary and adjacent to the installation field, the assembling of the array of photovoltaic solar panels further comprising:
        assembling a support framework on the transportable base structure for receipt of a plurality of photovoltaic solar panels; and
        assembling the plurality of photovoltaic solar panels on the support framework positioned on the transportable base structure forming the array of photovoltaic solar panels;
    transporting the assembled array of photovoltaic solar panels to the installation field with the aid of a motorized carriage; and
    mounting the array of photovoltaic solar panels transported on support structures previously prepared on the installation field.

2. The method according to claim 1, wherein the assembling the support framework and the assembling the plurality of photovoltaic solar panels on said support framework positioned on the transportable base structure are both carried out by a single robot.

3. A method for assembling and installing arrays of photovoltaic solar panels in an installation field, comprising:
    assembling an array of photovoltaic solar panels, which is carried out with aid of at least one robot at a transportable station located stationary adjacent to the installation field, wherein said transportable station comprises:
        a base structure on which the at least one robot is mounted and located in position; and
        a bench mounted on the base structure, the bench supporting a conveying line operable to convey an auxiliary support structure on which said array of photovoltaic solar panels is assembled and located in position,
    wherein said assembling the array of photovoltaic solar panels further comprises assembling a support framework for receipt of a plurality of photovoltaic solar panels; and assembling the plurality of photovoltaic solar panels on said support framework forming the array of photovoltaic solar panels;
        transporting the assembled array of photovoltaic solar panels from said transportable station to the installation field with aid of a motorized carriage; and
        mounting the array of photovoltaic solar panels transported on support structures previously prepared on the installation field.

4. The method according to claim 3, wherein the transportable station further comprises:
    one or more containers mounted and located in position on the base structure, the one or more containers including components that are engaged by said at least one robot and assembled together to form said support framework; and
    a container mounted on the base structure including the plurality of photovoltaic solar panels to be mounted on said support framework.

5. The method according to claim 4, wherein said at least one robot loosely assembles the components of the support framework on said auxiliary support structure and also loosely assembles the plurality of photovoltaic solar panels on said assembled components, and in that connections of said components and said plurality of photovoltaic solar panels are completed manually by operators located at a station adjacent to said transportable station.

6. The method according to claim 3, wherein said auxiliary support structure on which the array of photovoltaic solar panels is assembled by said at least one robot comprises a horizontal auxiliary frame which is advanced along said conveying line, above said bench mounted on the base structure, to bring in sequence different portions of said horizontal auxiliary frame adjacent to said at least one robot and enable the assembling of said support framework and of the plurality of photovoltaic solar panels on the horizontal auxiliary frame by said at least one robot, said horizontal auxiliary frame being configured to locate in position and temporarily hold components of at least one of the support framework or the plurality of photovoltaic solar panels.

7. The method according to claim 3, wherein said transporting the assembled array of photovoltaic solar panels with the aid of the motorized carriage is without a driver onboard the motorized carriage, the motorized carriage is controlled by an operator positioned outside the carriage, and is configured to transport the assembled array of photovoltaic solar panels and to deposit said array of photovoltaic solar panels above the support structures previously prepared on the installation field.

8. The method according to claim 3, wherein said base structure arranged at said transportable station comprises a platform of an industrial vehicle.

9. A system for assembling and installing arrays of photovoltaic solar panels in an installation field, the system comprising:
    a transportable station, to be located stationary adjacent to the installation field, the transportable station further comprising:
        at least one robot configured and programmed to assemble the arrays of photovoltaic solar panels;
        a base structure on which said at least one robot is mounted and located in position; and
        a bench mounted and located in position on the base structure, wherein the bench supports a conveying line operable to convey an auxiliary support structure on which said arrays of photovoltaic solar panels are to be assembled by said at least one robot, by assembling a support framework for receipt of a plurality of photovoltaic solar panels and by assembling the plurality of photovoltaic solar panels on said support framework forming the arrays of photovoltaic solar panels; and
    a motorized carriage for transporting the arrays of photovoltaic solar panels assembled at said transportable station to a place of installation of the arrays of photovoltaic solar panels in the installation field, wherein the arrays of photovoltaic solar panels are to be assembled on support structures previously arranged in the installation field.

10. The system according to claim 9, wherein the transportable station further comprises:
    one or more piece-holding containers mounted and located in position on the base structure, the one or more piece-holding containers including components engaged by said at least one robot and assembled together to form said support framework; and
    one or more containers mounted on the base structure including the plurality of photovoltaic solar panels.

11. The system according to claim 9, wherein said auxiliary support structure on which the arrays of photovoltaic solar panels are assembled comprises a horizontal auxiliary frame which is advanced along said conveying line above said bench mounted on said base structure to bring in sequence different portions of said auxiliary frame adjacent to said at least one robot and enable assembling on the auxiliary frame by the at least one robot of said support framework for the plurality of photovoltaic solar panels.

12. The system according to claim 11, wherein said conveying line comprises:
   a support and guide carried by said bench operable to support and guide a movement of said horizontal auxiliary frame in a longitudinal horizontal direction (X); and
   an actuator carried by said bench operable to actuate the movement of said horizontal auxiliary frame along said longitudinal horizontal direction.

13. The system according to claim 12, wherein said support and guide comprises a plurality of rollers or wheels rotatably mounted on said bench.

14. The system according to claim 13, wherein one or more of said plurality of rollers or wheels are motorized, so that they also act as the actuator operable to actuate the movement of the horizontal auxiliary frame.

15. The system according to claim 12, wherein at least one electronic controller is mounted on said base structure of the transportable station to control said at least one robot, and to control said actuator for the movement of the horizontal auxiliary frame, said at least one electronic controller being configured to advance said horizontal auxiliary frame up to an operating position wherein said at least one robot assembles thereon the support framework and positions the plurality of photovoltaic solar panels on the support framework thus assembled.

16. The system according to claim 15, wherein said at least one electronic controller is configured to advance said support framework in steps, to enable said at least one robot to carry out a step-by-step assembling of the support framework and the plurality of photovoltaic solar panels on different portions of said horizontal auxiliary frame.

17. The system according to claim 16, wherein said bench is provided with a locating device, to locate said horizontal auxiliary frame in a predetermined position after each step advance thereof.

18. The system according to claim 17, wherein the horizontal auxiliary frame comprises an aligned series of horizontal auxiliary frames, connected to each other in a removable manner, and positionable in succession above said bench, to enable assembling on each horizontal auxiliary frame of a respective array of photovoltaic solar panels.

19. The system according to claim 18, wherein at least one of upstream or downstream of said bench, with reference to the longitudinal horizontal direction (X) of the aligned series of horizontal auxiliary frames, an independent support structure is provided, comprising a support and guide device for the horizontal auxiliary frames.

20. The system according to claim 19, wherein said independent support structure further comprises an upper surface having freely rotatable rollers or wheels, to support and guide the movement of respective horizontal auxiliary frames whose movement is driven by said actuator carried by said bench.

21. The system according to claim 11, wherein said base structure arranged at said transportable station comprises a platform of an industrial vehicle, said bench being arranged on said platform with said conveying line arranged to guide said horizontal auxiliary frames for movement in a longitudinal horizontal direction (X) perpendicular to a longitudinal direction of the platform of the industrial vehicle.

22. The system according to claim 11, wherein said horizontal auxiliary frame comprises support and containment elements, to locate in position, and temporarily hold in a loosely connected condition, both components of the support framework that are placed on the horizontal auxiliary frame by said at least one robot, and respective of the plurality of photovoltaic solar panels that are placed on the support framework by said at least one robot, said system further comprising a station adjacent to said transportable station where the loosely connected components and the plurality of photovoltaic solar panels are completed manually by operators.

23. The system according to claim 22, wherein said motorized carriage comprises a lifting device configured to pick up, lift and deposit the respective arrays of photovoltaic solar panels.

24. The system according to claim 9, wherein said motorized carriage for transporting the arrays of photovoltaic solar panels assembled at said transportable station to the place of installation of the arrays of photovoltaic solar panels in the installation field is without a driver onboard the motorized carriage, the motorized carriage is configured to be controlled by an operator positioned outside the motorized carriage, and designed to transport the assembled arrays of photovoltaic solar panels to the place of installation and to deposit the arrays of photovoltaic solar panels above the support structures arranged on the installation field.

25. The system according to claim 24, wherein said motorized carriage comprises a vertically movable upper platform, configured to support the respective arrays of photovoltaic solar panels, and to lay the respective arrays of photovoltaic solar panels on top of said support structures prepared in the installation field.

26. A method for assembling and installing arrays of photovoltaic solar panels in an installation field, comprising:
   assembling an array of photovoltaic solar panels at a transportable station located stationary adjacent to the installation field, the assembling of the array of photovoltaic solar panels comprising:
      assembling a support framework for receipt of a plurality of photovoltaic solar panels; and
      assembling the plurality of photovoltaic solar panels on said support framework forming the array of photovoltaic solar panels, wherein said assembling of said support framework and said assembling of said plurality of photovoltaic solar panels on said support framework are both carried out by a single robot;
   transporting the assembled array of photovoltaic solar panels from said transportable station to the installation field with aid of a motorized carriage; and
   mounting the array of photovoltaic solar panels transported on support structures previously prepared on the installation field.

* * * * *